US006702674B1

(12) United States Patent
De Bruin et al.

(10) Patent No.: US 6,702,674 B1
(45) Date of Patent: Mar. 9, 2004

(54) METHOD OF AND SYSTEM FOR OPERATING GAMING MACHINES

(75) Inventors: Andreas Cornelis De Bruin, Dapto (AU); Trevor Selwyn Jones, Herston (AU); Robert John Algie, Abergoasslyn (AU); Michael James Wolter, Lake Illawarra (AU); Harald Dorfer, Ocean Shores (AU); Danny Travis Williams, Coorparoo (AU); Christopher Stephen Daly, Toowong (AU)

(73) Assignee: Golden Casket Lottery Corporation Limited, Queensland (AU)

( * ) Notice: Subject to any disclaimer, the term of this patent is extended or adjusted under 35 U.S.C. 154(b) by 0 days.

(21) Appl. No.: 09/650,032

(22) Filed: Aug. 28, 2000

(30) Foreign Application Priority Data

Aug. 27, 1999 (AU) .............................................. PQ2518

(51) Int. Cl.[7] ................................................ A63F 13/12

(52) U.S. Cl. ............................ 463/26; 463/16; 463/42; 463/22

(58) Field of Search ............................... 463/22, 25–27, 463/28, 40, 42, 16–20; 273/138.1, 139, 143 R; 700/90–91

(56) References Cited

U.S. PATENT DOCUMENTS 3,269,503 A * 8/1966 Foster ........................... 194/1
4,283,709 A * 8/1981 Lucero et al. .......... 340/147 R
4,636,951 A * 1/1987 Harlick ........................ 364/412
4,652,998 A * 3/1987 Koza et al. ................. 364/412
4,805,907 A * 2/1989 Hagiwara ............... 273/138 A
5,116,055 A * 5/1992 Tracy ...................... 273/138 A
5,249,800 A * 10/1993 Hilgendorf et al. ..... 273/138 A
5,263,716 A 11/1993 Smyth
5,280,909 A * 1/1994 Tracy ...................... 273/138 A
5,564,700 A * 10/1996 Celona ........................ 463/27
5,580,309 A * 12/1996 Piechowiak et al. .......... 463/16
5,611,730 A * 3/1997 Weiss .......................... 463/20
5,655,961 A * 8/1997 Acres et al. .................. 463/27
5,770,533 A * 6/1998 Franchi ........................ 463/42
5,941,773 A * 8/1999 Harlick ......................... 463/26
6,089,980 A * 7/2000 Gauselmann ................ 463/27
6,102,799 A * 8/2000 Stupak ......................... 463/27
6,213,877 B1 * 4/2001 Walker et al. ................ 463/26
6,224,482 B1 * 5/2001 Bennett ....................... 463/20

FOREIGN PATENT DOCUMENTS

AU 613046 6/1987
AU 589158 10/1989
AU B-51153/90 9/1990
AU A-13023/92 9/1992
AU B-52186/93 7/1994

(List continued on next page.)

*Primary Examiner*—Teresa Walberg
*Assistant Examiner*—Scott E. Jones
(74) *Attorney, Agent, or Firm*—Ditthavong & Carlson, P.C.

(57) ABSTRACT

A method of and a system (10) for providing a jackpot award for a plurality of gaming machines (40) are disclosed. The system (10) gaming machines (40) linked by at least one venue jackpot controller (300) to a central jackpot controller. The method includes increasing a jackpot value by an amount corresponding to a predetermined percentage; randomly determining whether to award the jackpot value; and randomly awarding the jackpot value to a selected gaming machine (40) associated with a selected venue jackpot controller (300) when jackpot award conditions are met.

26 Claims, 32 Drawing Sheets

FOREIGN PATENT DOCUMENTS

| | | | |
|---|---|---|---|
| AU | A-47907/96 | | 9/1996 |
| AU | B-52499/96 | | 2/1997 |
| AU | 704365 | | 4/1997 |
| AU | 680602 | | 7/1997 |
| AU | 1997 12662 | | 8/1997 |
| AU | 697582 | | 2/1998 |
| AU | A-47626/97 | | 6/1998 |
| AU | A-61905/98 | | 10/1998 |
| AU | A-64844/98 | | 11/1998 |
| AU | A-84162/98 | | 3/1999 |
| AU | 199936763 | A1 | 1/2000 |
| AU | 2000 27769 | | 10/2000 |
| DE | 195 24 135 | | 1/1997 |
| WO | WO 96/24421 | | 8/1996 |
| WO | WO 97/12338 | | 4/1997 |
| WO | WO 97/27568 | | 7/1997 |
| WO | WO 99/03078 | | 1/1999 |
| WO | WO 99/21630 | | 5/1999 |
| ZA | 9901056 | A | 10/1999 |

* cited by examiner

CJC - Block Diagram

Display WIN message

METHOD OF AND SYSTEM FOR OPERATING GAMING MACHINES

FIELD OF THE INVENTION

The present invention relates generally to gaming machines and, in particular, to a plurality of inter-linked gaming machines that provide a jackpot prize-winning mode of operation. The jackpot prize-winning mode is additional to the prize-winning that occurs during normal play on the machines.

BACKGROUND OF THE INVENTION

Systems for awarding jackpot prizes that are separate from the normal prizes available during the normal playing of gaming machines are known. These systems consist of linked gaming machines communicating with a central computer. The central computer receives information from the gaming machines relating to each play on a machine and, sometimes, the value of the wager on the machine. A jackpot prize pool accumulates with each machine play and the accumulated jackpot prize is available on a display. The jackpot prize is awarded when a randomly selected jackpot prize value is reached and the prize is awarded to the player of the machine who was responsible for causing the accumulated jackpot prize to reach or exceed the random value.

Another system uses a prize accumulation phase and a prize awarding phase which are independent of one another. During the prize accumulation phase a starting or initial value is determined as a monetary value between prescribed limits and a random prize value between two limits is added to the initial value. A percentage accumulation is caused in a prize pool when gaming machines are played. When the prize pool equals the sum of the random prize value and the initial value, the prize pool is frozen and the prize accumulation phase is concluded. A prize-awarding phase is then commenced and a "win count" value is randomly selected. Each player of a machine has a chance of winning the known prize value. The prize-awarding phase is independent of the prize accumulation phase.

Each play-input event during the prize-awarding phase is counted and units wagered are separately accumulated in an "excess pool". A processor then compares the number of input events with the randomly determined win count. If the number of input events is less than the randomly determined win count the process continues. If the number of input events is greater than or equal to the randomly determined win count a win occurs and the machine whose play was responsible for equaling or exceeding the win count is recorded as the winner and the player is entitled to redeem the prize. The excess pool value is then added to the starting value.

It is an object of the present invention to provide a method of and a system for jackpot prize-winning mode of operation, which differs from the previously mentioned systems and encourages machine usage and player enjoyment.

SUMMARY OF THE INVENTION

According to a first aspect of the present invention there is provided a method of providing a jackpot award for a plurality of gaming machines linked by at least one venue jackpot controller to a central jackpot controller, the method comprising the steps of:

a. randomly determining whether to award the jackpot value;

b. randomly selecting a venue for award of the jackpot value;

c. randomly selecting a gaming machine for award of the jackpot value;

d. awarding the jackpot value.

The jackpot value can have an initial value that is randomly determined.

Preferably, the jackpot value can be increased by a percentage of the total increase in turnover associated with the venue jackpot controllers.

Preferably, the step of determining whether to award the jackpot value further comprises the steps of:

generating a random number from a random number generator; and determining whether the random number is equal to a jackpot hit value. A range for the random number generator is determined prior to the step of generating the random number Preferably, the method includes the steps of:

randomly determining a venue hit number;

adding together the increase in turnover associated with each venue jackpot controller until the addition of the increase in turnover associated with a particular venue jackpot controller results in the venue hit number being equaled or exceeded;

randomly determining a gaming machine hit number;

adding together the increase in turnover of each gaming machine associated with the venue jackpot controller responsible for the venue hit number being equaled or exceeded until the addition of the increase in turnover of a particular gaming machine results in the gaming machine hit number being equaled or exceeded; and awarding the jackpot value to the gaming machine responsible for the gaming machine hit number being equaled or exceeded.

Preferably, the step of awarding the jackpot value is repeated if the jackpot value is unsuccessfully awarded to a gaming machine.

According to a second aspect of the present invention there is provided a system for providing a jackpot award for a plurality of gaming machines, the system comprising:

a central jackpot controller; one or more venue jackpot controllers associated with one or more venues; a wide area communications network linking the central jackpot controller and the one or more venue jackpot controllers; a local area communications network associated with each of the one or more venue jackpot controllers; and a plurality of electronic gaming machines in communication with each the one or more venue jackpot controllers via the local area communications network; wherein the central jackpot controller includes processor means programmed to:

(a) periodically poll the venue jackpot controllers to obtain turnover data;

(b) randomly determine whether to award the jackpot value;

(c) randomly select the venue for award of the jackpot value based upon the turnover data; and (d) randomly select the electronic gaming machine to be awarded the jackpot value based upon the turnover data.

Preferably, at least one jackpot display is linked to an associated venue jackpot controller. Each venue jackpot controller controls and monitors an associated jackpot display.

Preferably, a data management system is linked to the central jackpot controller.

Preferably, the jackpot award comprises a plurality of jackpot values.

Preferably, each venue jackpot controller monitors the turnover of all associated gaming machines.

Preferably, each venue jackpot controller transmits an associated turnover to the central jackpot controller in response to the central jackpot controller periodically polling the venue jackpot controllers. The central jackpot controller determines whether the turnover associated with each venue jackpot controller has increased since the last poll. Any unacceptable venue turnover is rejected by the central jackpot controller.

Preferably, the central jackpot controller increases the jackpot value by a percentage of the total increase in turnover associated with the venue jackpot controllers.

Preferably, the central jackpot controller determines whether to award the jackpot value by generating a random number and then determining whether the random number is equal to a jackpot hit value.

Preferably, when the central jackpot controller determines that the jackpot value is to be awarded the central jackpot controller randomly determines a venue hit number and adds together the increase in turnover associated with each venue jackpot controller until the addition of the increase in turnover associated with a particular venue jackpot controller results in the venue hit number being equalled or exceeded. The central jackpot controller then randomly determines a gaming machine hit number and adds together the increase in turnover of each gaming machine associated with the venue jackpot controller responsible for the venue hit number being equalled or exceeded until the addition of the increase in turnover of a particular gaming machine results in the gaming machine hit number being equalled or exceeded. The central jackpot controller then awards the jackpot value to the gaming machine responsible for the gaming machine hit number being equalled or exceeded.

Preferably, the central jackpot controller re-selects a gaming machine if the jackpot value is unsuccessfully awarded to a gaming machine.

Preferably, the jackpot value has an initial value that is randomly determined.

In order that the invention may be more fully understood and put into practice, a preferred embodiment thereof will now be described with reference to the accompanying drawings.

DETAILED DESCRIPTION OF CERTAIN EMBODIMENTS OF THE INVENTION

The system operation will now be described with reference to FIGS. 1 to 3.

Figure 1:
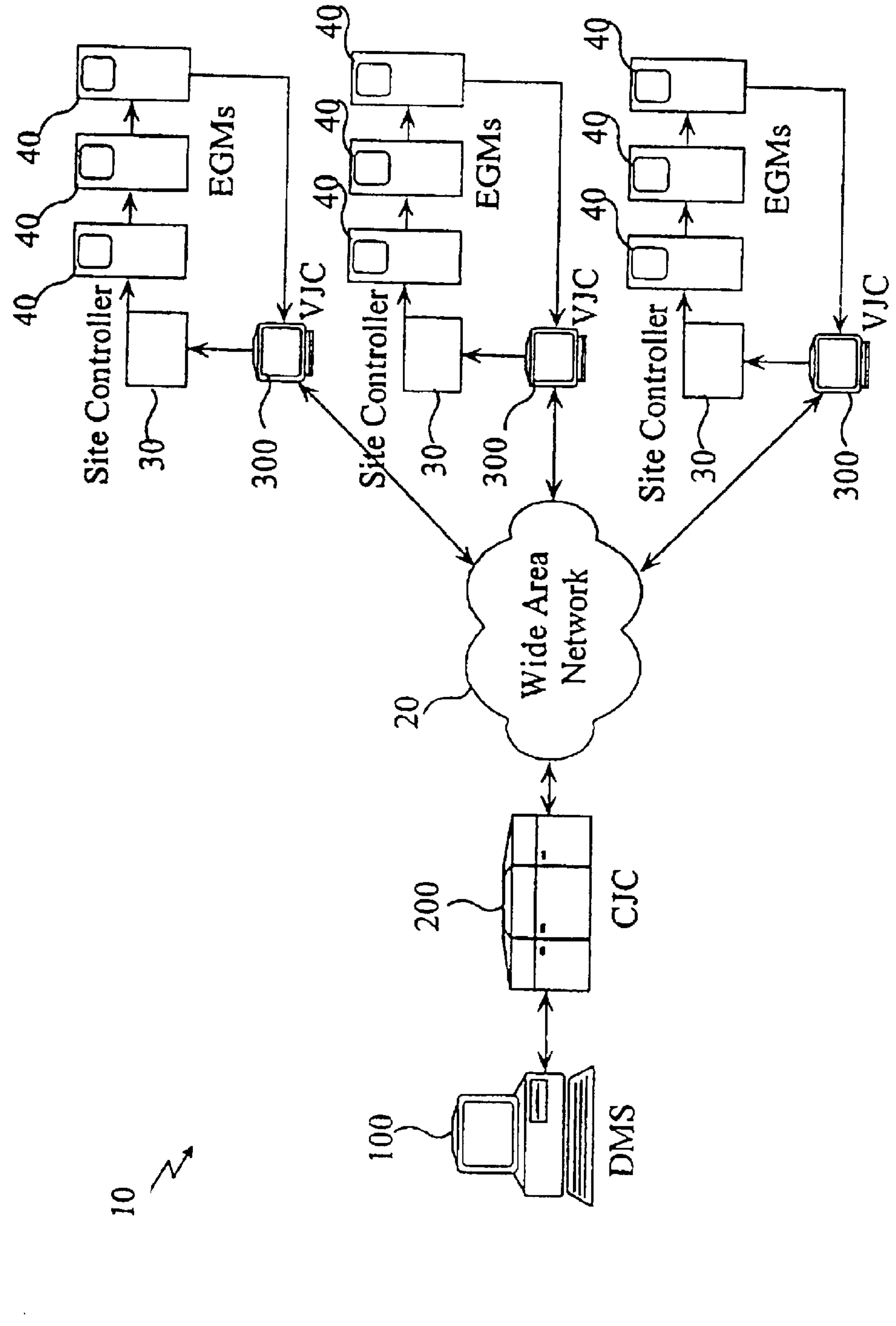
FIG. 1 is a block diagram of a jackpot gaming system according to an embodiment of the invention.

FIG. 1 is a block diagram of a non-deterministic jackpot system 10. A non-deterministic jackpot system is one in which the triggering of a jackpot win is not dependent on a previous event, and in which there is no increased probability over time of the jackpot being awarded. Thus, the jackpot amount that is offered by the system 10 does not have an upper value limit.

The system 10 comprises a Central Jackpot Controller (CJC) 200 communicating with a plurality of Venue Jackpot Controllers (VJC) 300 via a Wide Area Network (WAN) 20. The CJC 200 also communicates with a Data Management System (DMS) 100.

Each VJC 300 is located at a gaming venue having one or more Electronic Gaming Machines (EGM) 40. The EGMs 40 at each venue communicate with an associated VJC 300 and Site Controller 30. The EGMs 40 could, for example, be electronic poker machines of the type that are commonly supplied at gaming venues.

The system 10 also includes other peripheral equipment such as electronic displays, power supplies and network boards which are not shown in FIG. 1.

The CJC 200 is the controller at the centre of the jackpot system 10. The CJC 200 is the only device in the system 10 that is capable of triggering a jackpot win.

The VJC 300 is a device whose functions include monitoring turnover on the EGMs 40, verifying the turnover for validity and transmitting the turnover to the CJC 200. Each VJC 300 also controls and monitors any associated electronic displays (not shown). There can be more than one VJC 300 located at each venue.

The DMS 100 is the user interface to the CJC 200 and VJC 300 devices. The DMS 100 facilitates the uploading of information to the CJC 200 and the receipt of messages from the CJC 200.

The system 10 of the present embodiment works on a 6-second polling cycle with the CJC 200 controlling all system functions and timing. Other fixed duration polling cycles between 1 second and 10 seconds may also be suitable. The system 10 provides a plurality of jackpot levels however, for simplicity, only one jackpot level will be discussed here. It should be noted thought that with multiple jackpot levels the functions are the same and all jackpot levels are calculated simultaneously.

Figure 2:
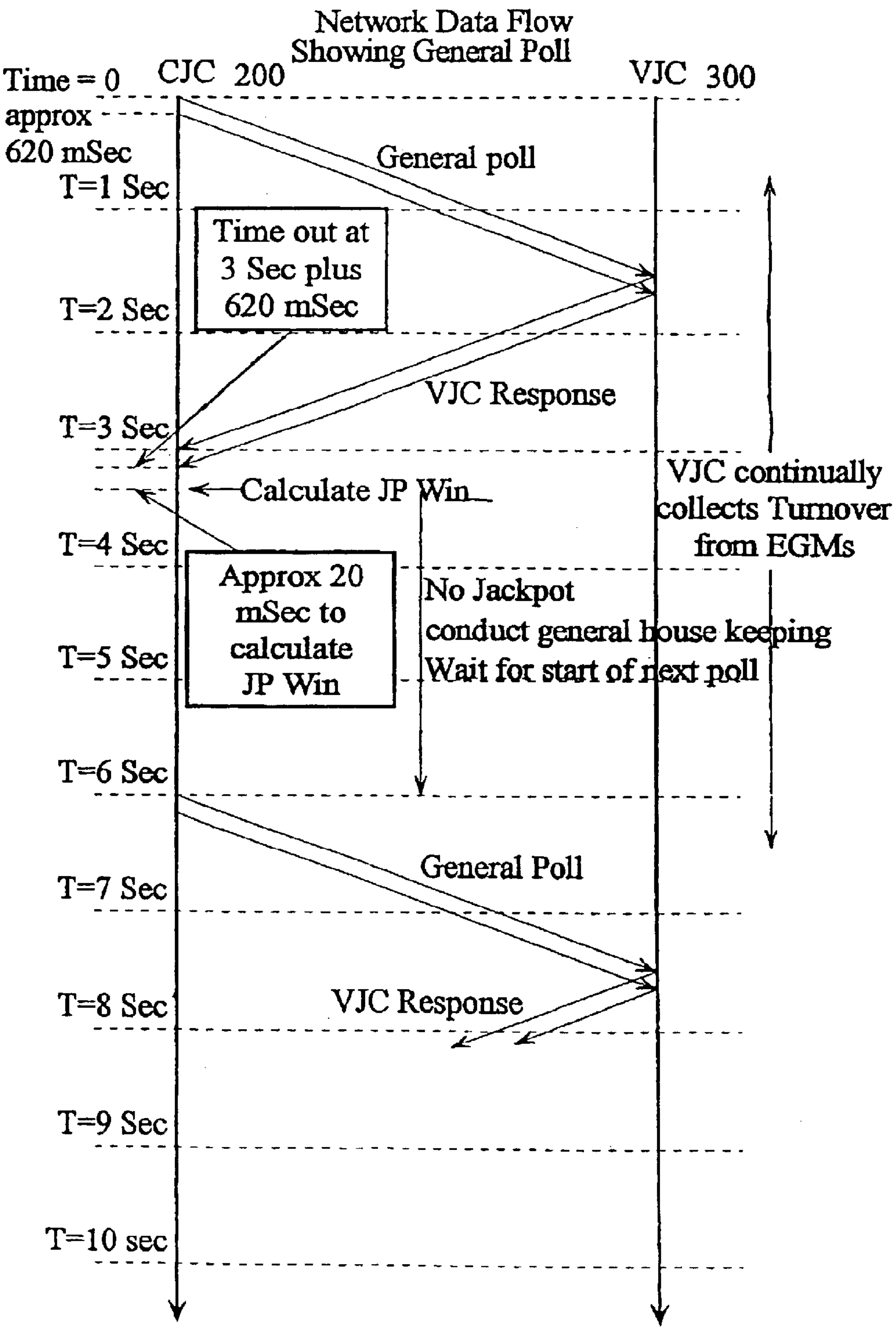
FIG. 2 is a timing diagram of the general poling cycle of the system illustrated in FIG. 1.

FIG. 2 is a timing diagram of the polling cycle of the system 10.

The polling cycle is commenced at T=0 seconds when the CJC 200 polls each VJC 300 for the sum of the current accumulated turnover of all EGMs 40 as well as an EGM Cyclic Redundancy Check (CRC) verification number for the associated EGMs 40.

Since the turnover supplied by each VJC 300 to the CJC 200 is accumulated turnover, this turnover will include turnover from previous polling cycles.

Cyclic Redundancy Checking is a commonly used technique for obtaining data reliability and is used to protect blocks of data, called frames, from being corrupted. The technique essentially consists of appending an extra n-bit sequence (called a Frame Check Sequence or FCS) to every frame. The FCS holds redundant information about the frame that enables errors in the frame to be detected. Cyclic Redundancy Checking is one of the most commonly used techniques for error detection in data communications and, as a result, this document will not attempt to explain the theory of Cyclic Redundancy Checking in any more detail as it is well known by those skilled in the art.

The EGM CRC verification number is a number arrived at by calculating a CRC across the turnover contribution of each EGM 40 since the commencement of the previous polling cycle. As an example, assume,that there are three EGMs 40 allocated to a particular VJC 300 at a venue, and the increase in turnover of the EGMs 40 since the commencement of the last polling cycle is 3, 2 and 1, respectively. The EGM CRC verification number is calculated by running a CRC across the 3 then continuing across the 2 and continuing across the 1. The resultant number is the EGM CRC verification number. Even though the EGM CRC verification number is sent to the CJC 200 each polling cycle, it is only used during the jackpot verification process when a jackpot is to be awarded.

In the present embodiment, the current accumulated turnover amounts and EGM CRC verification numbers are received by the CJC 200 from each VJC 300 approximately 3 seconds after the commencement of the polling cycle at T=0 seconds.

Upon receiving the current accumulated turnover amounts and EGM CRC verification numbers the CJC 200 checks each current accumulated turnover amount by verifying that the amount sent by each VJC 300 does not exceed a realistic value. At this point it should be noted that the turnover per unit time of an EGM 40 (and, hence, a VJC 300) will have an upper limit which cannot be exceeded by normal play of the EGM 40. Thus, if some of the equipment at a particular venue was tampered with, or malfunctioned in such a way as to simulate a very large turnover in order to influence the jackpot picking process (to be described later), the unrealistic amount would be identified by the CJC 200 which would then take appropriate action.

The current accumulated turnover amounts that pass the verification process are then used to calculate the turnover amount for the current polling cycle or, in other words, the amount of turnover since the last polling cycle. The turnover amount for the current polling cycle is called the Actual Turnover Contributed (ATC).

After the ATC has been calculated, a percentage of the ATC is added to the jackpot amount (also known as the jackpot value). This percentage is called the Jackpot Increment Percentage and is a constant that is entered into the DMS 100 and then uploaded to the CJC 200. If there is more than one jackpot level, a percentage of the ATC is added to the jackpot amount of each jackpot level. The Jackpot Increment Percentage for each jackpot level may vary. The new jackpot amount is then stored in the CJC 200 and a CRC is built across the new jackpot amount.

The CJC 200 then determines whether to award the updated jackpot amount. This is done by generating a random number within the CJC 200 and comparing the random number with a predefined Jackpot Hit Value. If the random number is equal to the Jackpot Hit Value this is classed as a jackpot hit. If there is more than one jackpot level, a random number is drawn for each jackpot level and compared with a corresponding Jackpot Hit Value.

Before an additive random number generator RNG within the CJC 200 generates the random number, a range called the Jackpot Hit Range for the RNG may first be determined. The Jackpot Hit Range is effectively the chance of winning a jackpot during the polling cycle and is inversely proportional to the ATC during the poll. In other words, the higher the ATC for a particular polling cycle, the smaller the Jackpot Hit Range and, hence, the greater the chance of the jackpot being awarded.

The Jackpot Hit Range for a particular polling cycle is calculated as follows;

$$\text{Jackpot Hit Range} = \text{System Range} \times \frac{\text{Expected Turnover Contributed}}{\text{Actual Turnover Contributed}}$$

Where, the System Range and the Expected Turnover Contributed (ETC) are constants that are entered into the DMS 100 and then uploaded to the CJC 200. The System Range is a number that determines the overall (probable) frequency that a particular jackpot level will be awarded at. For example, a System Range of 100,000 for a particular jackpot level will result in that jackpot level being awarded twice as often compared to the case where the System Range is equal to 200,000. The ETC is an estimate of the amount of turnover that will be contributed to a particular jackpot level for each polling cycle. The Actual Turnover Contributed (ATC) has been discussed previously.

With reference to FIG. 2, if there is no hit on the Jackpot Hit Value of any particular jackpot level, the CJC 200 waits until 6 seconds have elapsed from the commencement of the current polling cycle to commence a new polling cycle in which the previously described process is repeated.

Figure 3:
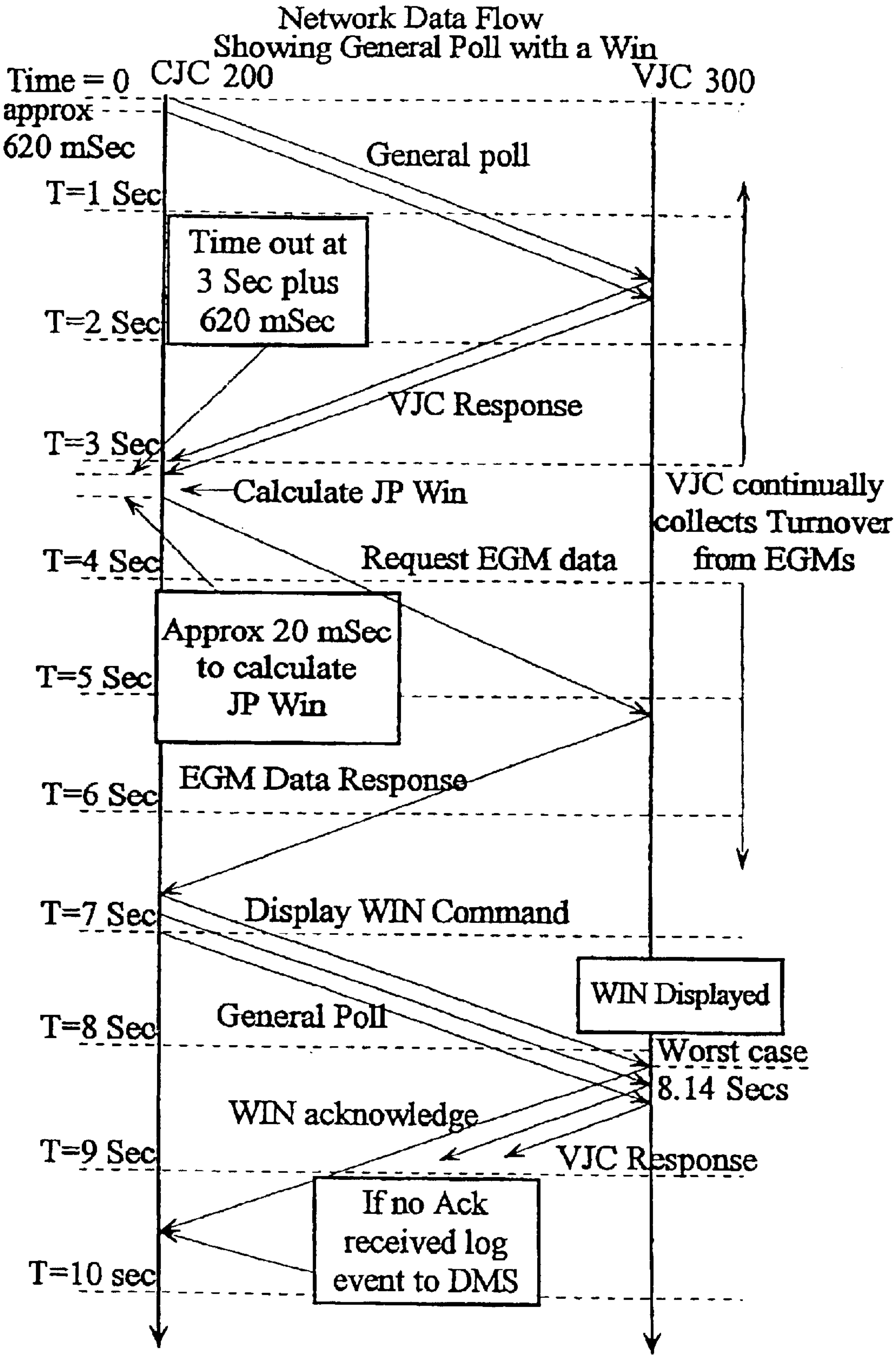
FIG. 3 is a timing diagram of the general polling cycle of the system illustrated in FIG. 1 when there is a hit on the Jackpot Hit Value.

FIG. 3 illustrates the instance where there is a hit on a Jackpot Hit Value of a particular jackpot level. In this case, if the ATC is greater than 0 (i.e. if there was turnover for the polling cycle), the CJC 200 then proceeds to pick the VJC 300 which will be awarded with the jackpot amount of the jackpot level. If there was no turnover for the polling cycle (i.e. ATC is equal to 0) and there was a hit on a Jackpot Hit Value of a particular jackpot level, the jackpot hit is simply ignored and thrown away since no jackpot can be awarded if none of the EGMs 40 were being played during the poll.

In order to pick a winning VJC 300, the CJC 200 uses the ATC as the range for the RNG. The RNG then generates a number which is called the Venue Hit Number. The cycle turnover of each VJC 300 (i.e. the turnover within the current polling cycle of each VJC 300), commencing with a first VJC 300, are then successively added together until the addition of the cycle turnover of a particular VJC 300 results in the Venue Hit Number being equalled or exceeded. The VJC 300 responsible for the Venue Hit Number being equalled or exceeded is the winning VJC 300. Thus, say for example, that there are three VJCs 300 and that the first VJC 300 has a cycle turnover of 9, the second VJC 300 has a cycle turnover of 3 and the third VJC 300 has a cycle turnover of 4. Therefore, the ATC is 16 and this number is used as the range for the RNG. The RNG then generates a Venue Hit Number between 0 and 16. If the generated Venue Hit Number is 10 (say) the CJC 200 then commences adding the cycle turnover of each VJC 300 starting with the first VJC 300. Thus, starting with 0, the cycle turnover of the first VJC 300 is added giving 9 which does not equal or exceed 10 (the Venue Hit Number) so, the cycle turnover of the second VJC 300 is added which gives 12. Since the addition of the cycle turnover of the second VJC 300 resulted in the Venue Hit Number being exceeded, the second VJC 300 is the winning VJC 300. It should be noted that this method of selecting the winning VJC 300 results in the VJCs 300 with greater cycle contributions to the jackpot levels having a greater chance of winning.

Once all of the winning VJCs 300 of each winning jackpot level have been determined, the winning VJCs 300 are polled (see FIG. 3) by the CJC 200 to transmit the cycle turnover of each of their EGMs 40 starting with the VJC's 300 first EGM 40. The CJC 200 then runs a CRC over the received cycle turnovers of the EGMs 40 and verifies it with the EGM CRC verification number that was previously determined during the first part of the polling cycle. If this verification fails, the system 10 is shutdown because it indicates that the system 10 may possibly have been tampered with. If the verification passes, the CJC 200 then proceeds to determine the EGM 40 (or EGMs 40 in the case of more than one jackpot level having been won) which has won the jackpot level.

The selection of the winning EGM 40 is preformed in the same way as the winning VJC 300 is selected. The cycle turnover of the winning VJC 300 is used as the range of the RNG. The RNG then generates an EGM Hit Number. The cycle turnover of each EGM 40 of the winning VJC 300 is then added (starting with the first EGM 40) and the EGM 40 that causes the EGM Hit Number to be equaled or exceeded is the winning EGM 40. Thus, for example, there might be three EGMs 40 with the first EGM 40 having a cycle turnover of 3, the second EGM 40 having a cycle turnover of 2 and the third EGM 40 having a cycle turnover of 2. The cycle turnover of the winning VJC 300 is therefore equal to 7. The RNG then generates an EGM Hit Number between 0 and 7. Assume that the EGM Hit Number is 5 (say). Now, starting with a value of 0, the cycle turnover of the first EGM 40 is added giving 3 which does not equal or exceed 5 (the EGM Hit Number) so the cycle turnover of the second EGM 40 is added which gives 5. Since the addition of the cycle turnover of the second EGM 40 resulted in the EGM Hit Number being equalled, the second EGM 40 is the winning EGM 40. This method of selecting the winning EGM 40 results in the EGMs 40 with greater contributions to the jackpot levels having a greater chance of winning.

With reference to FIG. 3, once the winning EGM 40 (or EGMs 40 in the case of multiple jackpot levels being won) is determined, the CJC 200 logs the win as being valid and the winning VJC 300 is notified of the win (about 7 seconds after the commencement of the cycle) followed by the other VJCs 300. Checks are made to ensure that each venue has received all jackpot win information. The DMS 100 is also sent the win information.

If a winning VJC 300 fails to acknowledge to the CJC 200 during the jackpot allocation process, the jackpot is deemed not to have occurred and a "re-pick" mode is initiated. In the re-pick mode the CJC 200 will attempt during the next polling cycle to allocate the jackpot. The whole procedure of choosing a winning venue, choosing a winning gaming machine and so on is repeated to ensure that the jackpot is not awarded to an inactive gaming machine.

In order to indicate to players the jackpot amount and/or that a jackpot has been won, each venue is provided with a display that is controlled by a VJC 300. In the winning venue, the display indicates the winning EGM 40 and the winning jackpot amount. At non-winning venues, the winning jackpot amount and the name of the venue where the jackpot was won will be displayed. The displays also indicate when a venue is offline to the CJC 200. The displays may also be provided with a means for audibly alerting the players when a jackpot has been won.

Next, the current jackpot amount for the awarded jackpot level is reset with a Jackpot Starting Amount, all other online VJCs 300 are notified of the award of the jackpot and then the next polling cycle is commenced. The Jackpot Starting Amount is a constant that is initially entered into the DMS 100 and then uploaded to the CJC 200.

As previously mentioned, the CJC 200 accepts a number of input parameters from the DMS 100 for each jackpot level. These input parameters dictate the operating characteristics of the respective jackpot levels. In summary, the input parameters that must be provided to the CJC 200 are the Jackpot Starting Amount, Jackpot Hit Range, Jackpot Increment Percentage and the Expected Turnover Contribution (ETC). Each of the aforementioned parameters are interrelated and influence the characteristics of the jackpot level at any given time.

The various hardware components of the system 10 will now be discussed with reference to FIGS. 4 to 15.

Figure 4:
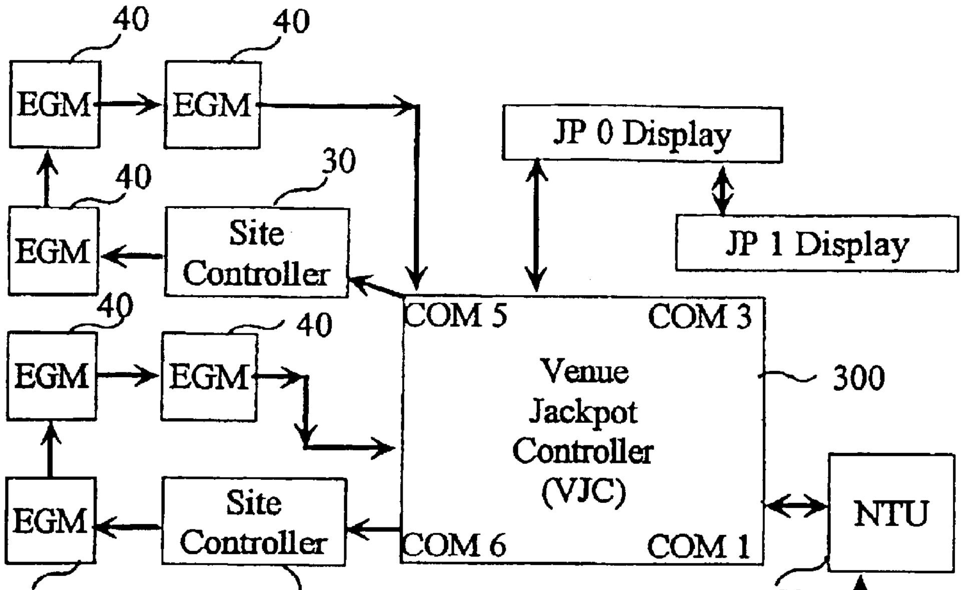
FIG. 4 is a block diagram of a Venue Jackpot Controller (VJC) and other associated system elements according to an embodiment of the invention.

FIG. 4 is a block diagram of the VJC 300 located at a particular venue having a plurality of EGMs 40. The system 10 includes at least one venue with EGMs 40 although it is preferred that a plurality of venues each controlled by a VJC 300 and each having a plurality of EGMs 40 be present in the system 10.

The VJC 300 receives information from the EGMs 40 and is able to transfer information from the EGMs 40 to the network 20 via a suitable Network Termination Unit (NTU) 50. The NTU 50 may comprise a suitable modem for communicating with the CJC 200.

The only verification that the VJC 300 performs is that it checks the validity of the turnover of each associated EGM 40, ensuring that the turnover of each associated EGM 40 does not exceed a given amount within a given time.

Two displays JP0 and JPI are associated with the VJC 300 and function to display jackpot amounts and a jackpot win message. The displays also indicate if a venue is offline.

The VJC 300 does not have any user interface or mechanism to permit:

- triggering any jackpot;
- resetting any jackpot;
- making configuration changes to any site or EGM data;
- changing any jackpot parameters; or
- altering any data pertaining to EGM turnover or jackpot contribution amounts.

The VJC 300 controls the jackpot displays JP0, JP1 and their associated meters to denote current jackpot amounts and display jackpot win messages. There is a means of acknowledging that the meters of the jackpot displays JP0, JP1 have received messages. This is monitored by the VJC 300 so that if a meter does not acknowledge, the CJC 200 can be informed of this.

Figure 5:
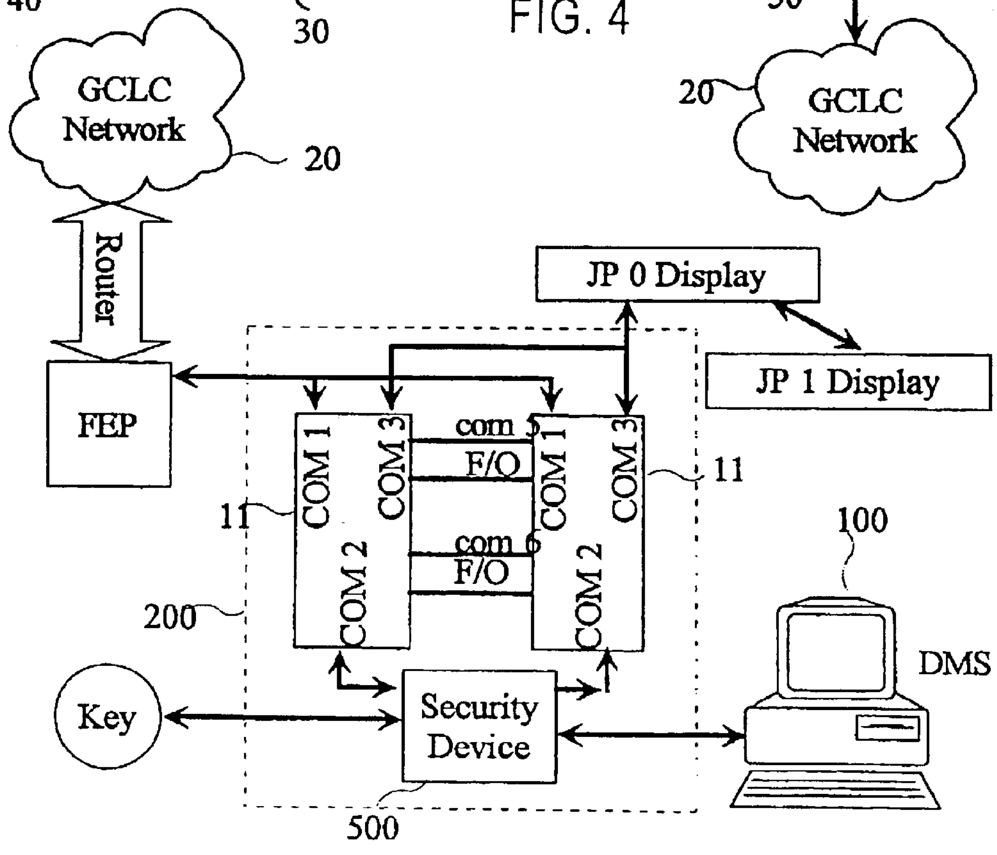
FIG. 5 is a block diagram of a Central jackpot Controller (CJC) and other associated system elements according to an embodiment of the invention.

FIG. 5 is a block diagram of the CJC 200 which communicates with the, or each, VJC 300 shown in FIG. 4. The CJC 200 communicates with the DMS 100 via a security device 500 configured for key operation. The CJC 200 operates two displays JP0, JP1 to provide a visual and/or audible indication of jackpot wins. The CJC 200 has high levels of security and data integrity and is able to trigger a jackpot. The CJC 200 may also have high levels of redundancy to ensure efficient and continual operation. The CJC 200 operates the RNG algorithm used to determine whether a jackpot has been won and to select the winning VJC 300 and winning EGM 40.

The CJC 200 will accept the following input from the DMS 100:

- venue details;
- EGM 40 configuration details;
- jackpot parameters (discussed previously);
- time;
- jackpot resets;
- system start-up; and
- system shutdown.

The CJC 200 will provide output to the DMS 100 of the following:

- system error messages;
- data sufficient to comply with any government regulation requirements;
- data sufficient to permit any Electronic Funds Transfer (EFT) processes to sweep nominated venue accounts of jackpot contributions; and
- other output sufficient to provide a detailed view of the status of the entire system 10 at any time.

Figure 6:
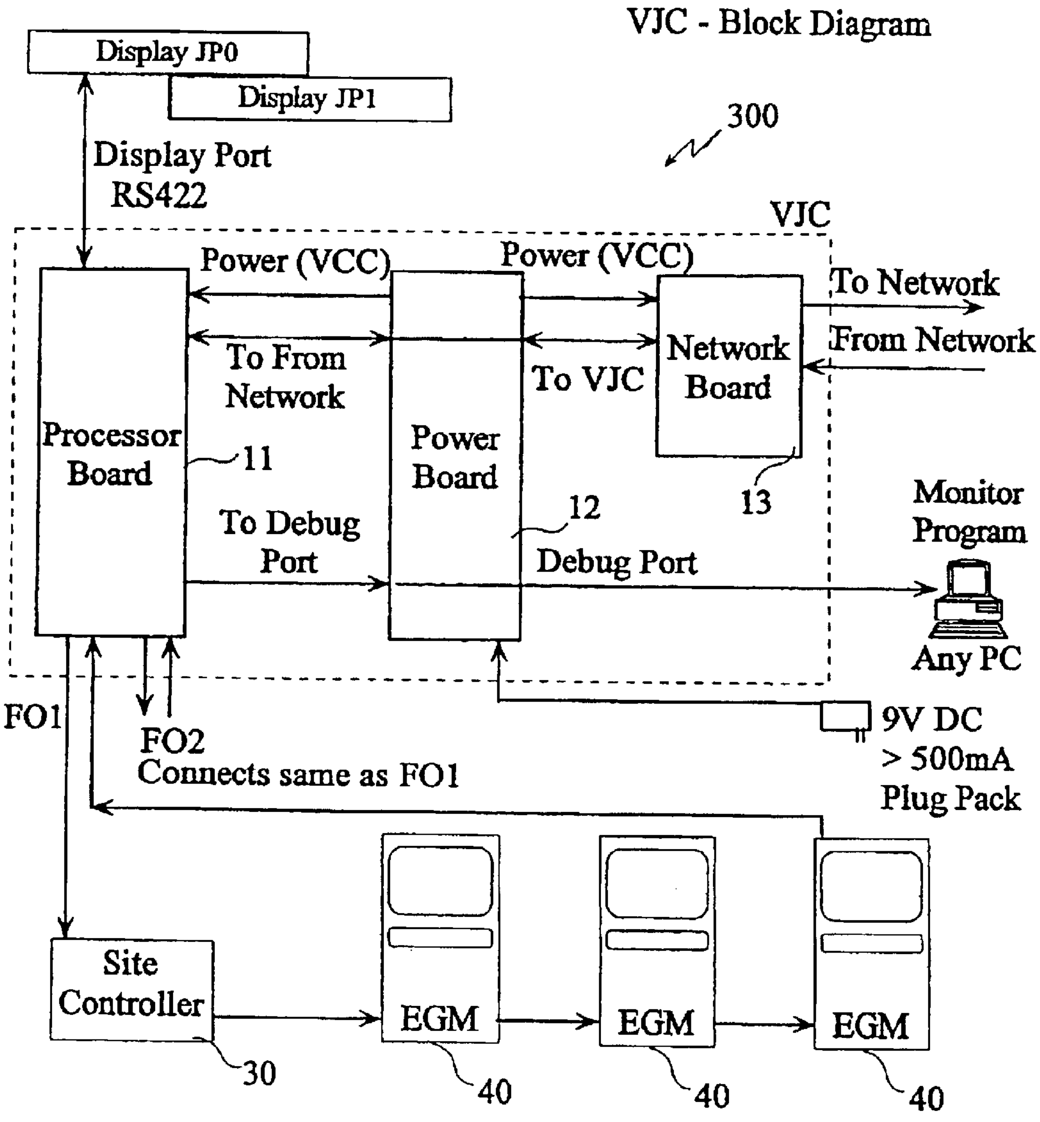
FIG. 6 is a detailed block diagram of the Venue Jackpot Controller (VJC) illustrated in FIG. 4.

FIG. 6 illustrates the VJC 300 of FIG. 4 in greater detail. In particular, FIG. 6 illustrates the different circuit boards from which the VJC 300 is composed. The circuit boards include a processor board 11, power board 12 and a network board 13.

Figure 8A:
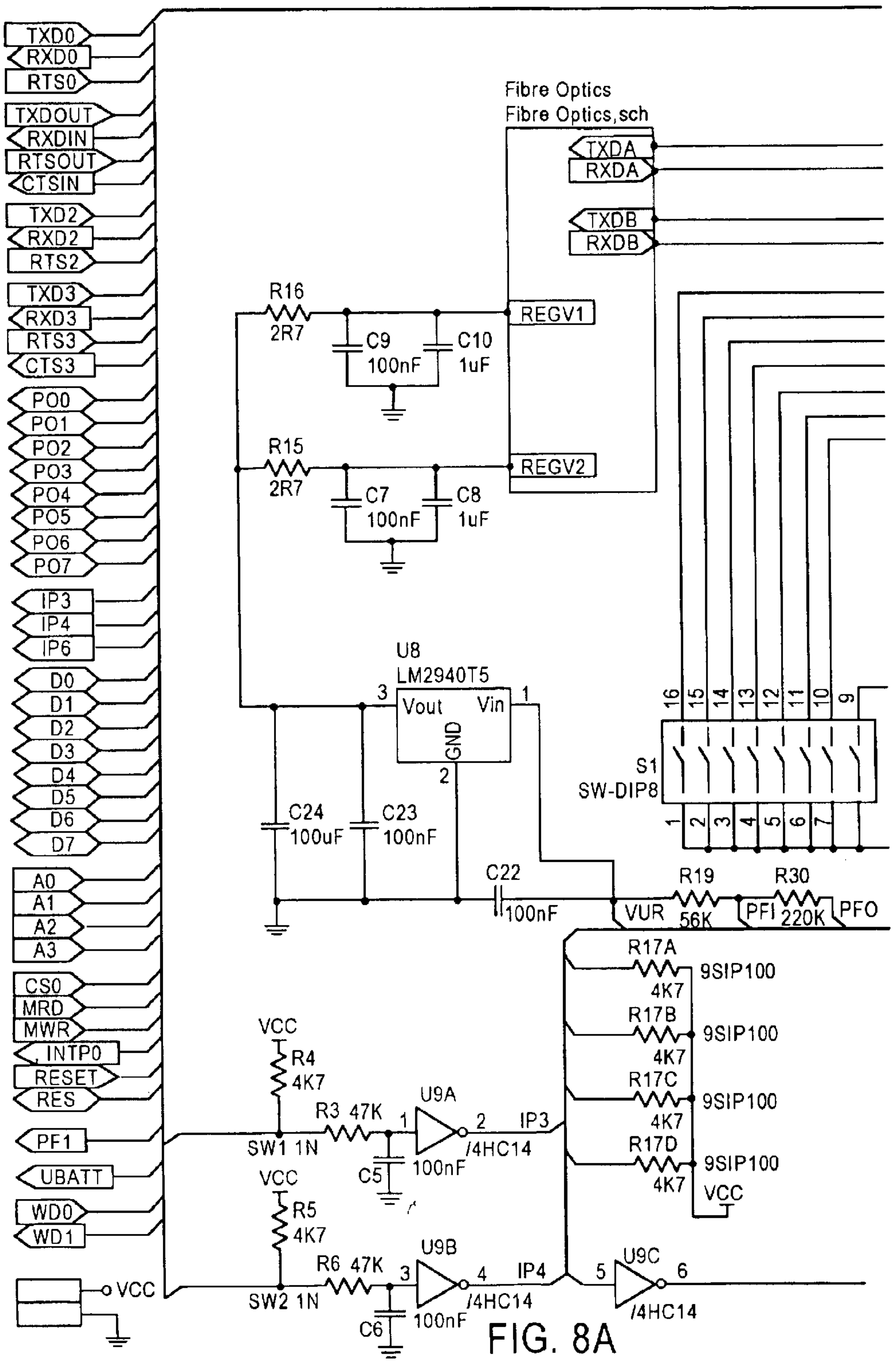
FIG. 8 is a schematic circuit diagram of a portion of the processor board used in the Central Jackpot Controller (CJC) and the Venue Jackpot Controller (VJC) according to an embodiment of the present invention.
Figures 8, 8B:
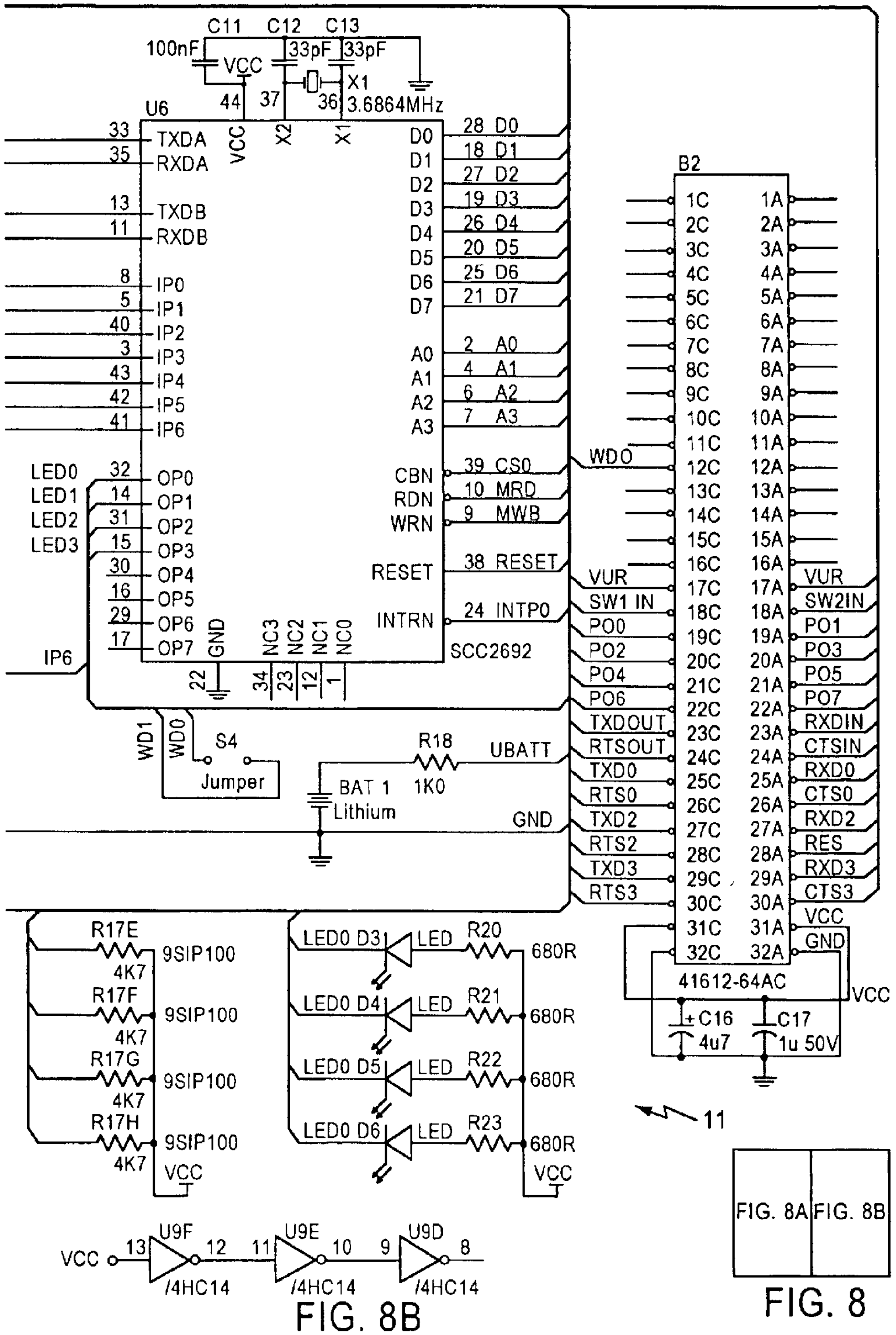
Figure 9A:
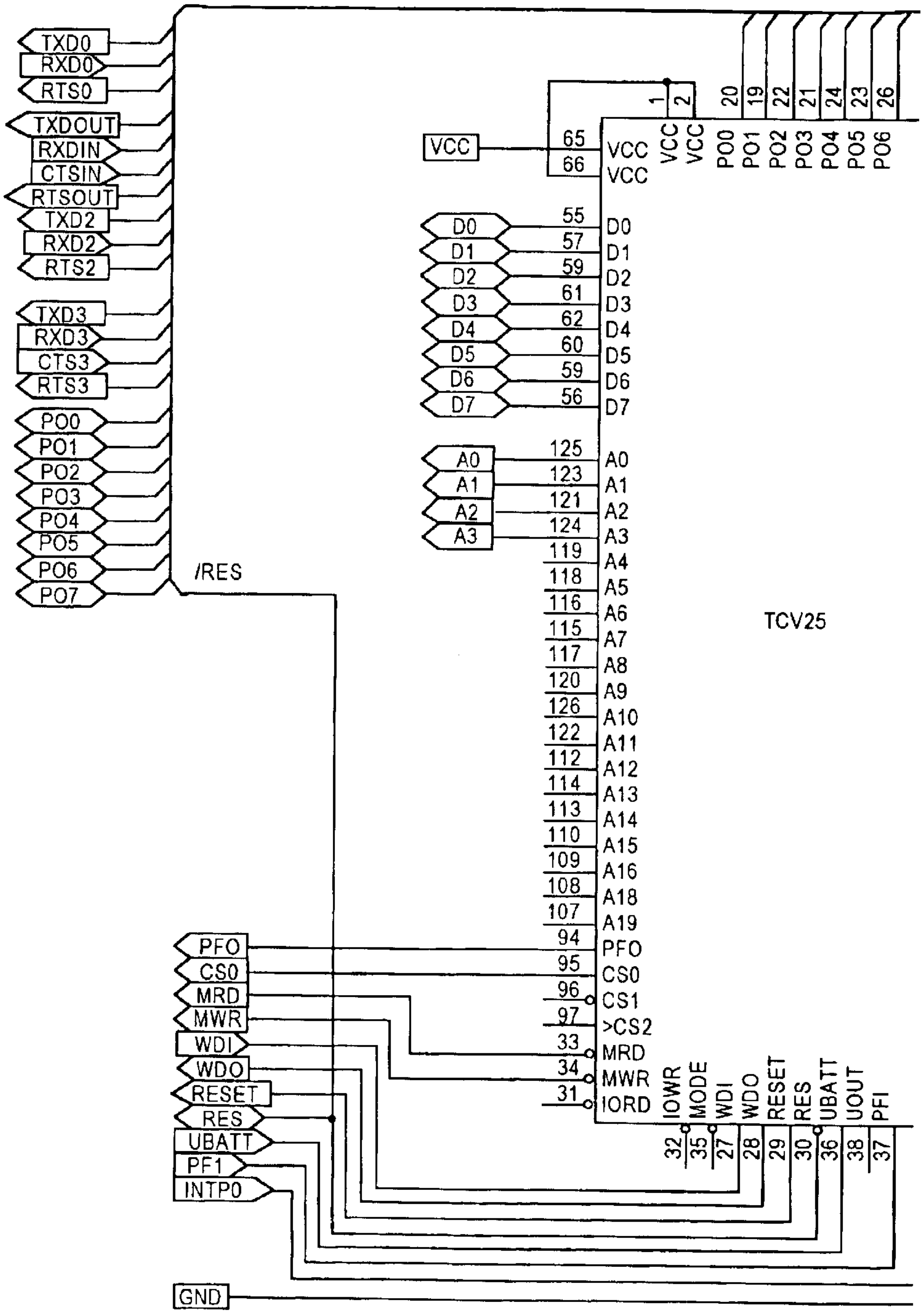
FIG. 9 is a schematic circuit diagram of the TCV25P module used with the processor board of FIG. 8.
Figure 9B:
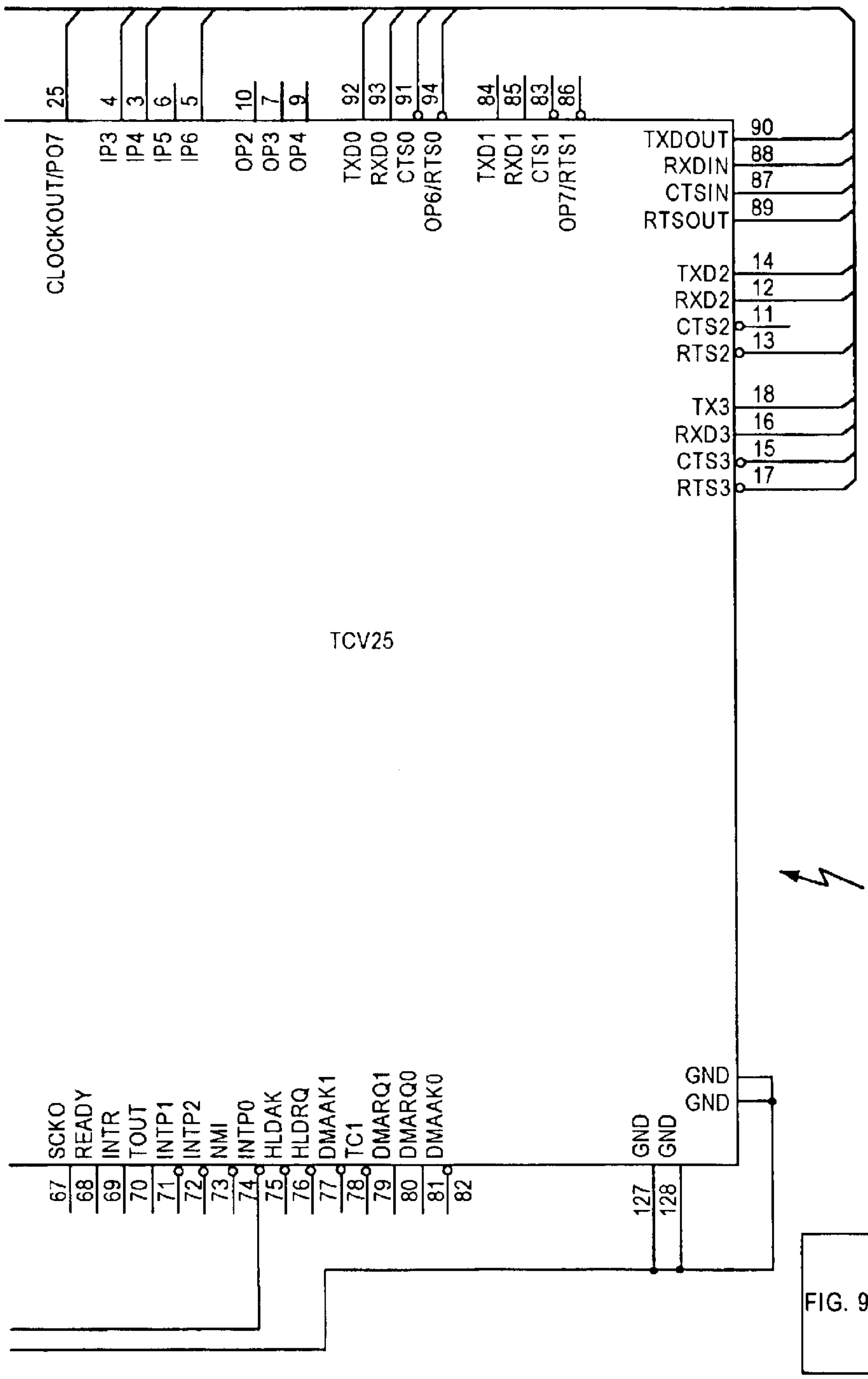
Figure 9:
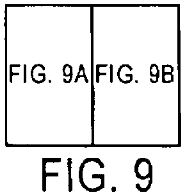

A schematic circuit diagram of a portion of the processor board 11 is illustrated in FIG. 8. The processor board 11 is based around a TCV25P 6-bit microprocessor module 21 (see FIG. 9) that is incorporated into the processor board 11. The TCV25P 16-bit microprocessor module 21, in turn, is based on the NEC V25+ microprocessor. A Real Time Clock (RTC) (not shown) and a Dual UART (DUART) (not shown) are included in the module 21 in addition to the extensive peripherals contained within the V25+ processor. The RTC and SRAM of the module 21 can be buffered an external battery. The module 21 and, more particularly, the NEC V25+ microprocessor will not be detailed any further in this document as further information can be obtained from the component manufacturers.

The DIP switch S1 (see FIG. 8) is used to set the address of the VJC 300 in the system 10. For example, if a VJC 300 is to be defined as the first venue in the system 10, the DIP switch must be set with all except the first switch in the OFF position. Likewise, for the VJC 300 to read commands sent from the CJC 200 to the ninth venue, the DIP switch must be set with all except the first and fourth switches in the OFF position.

Figure 10:
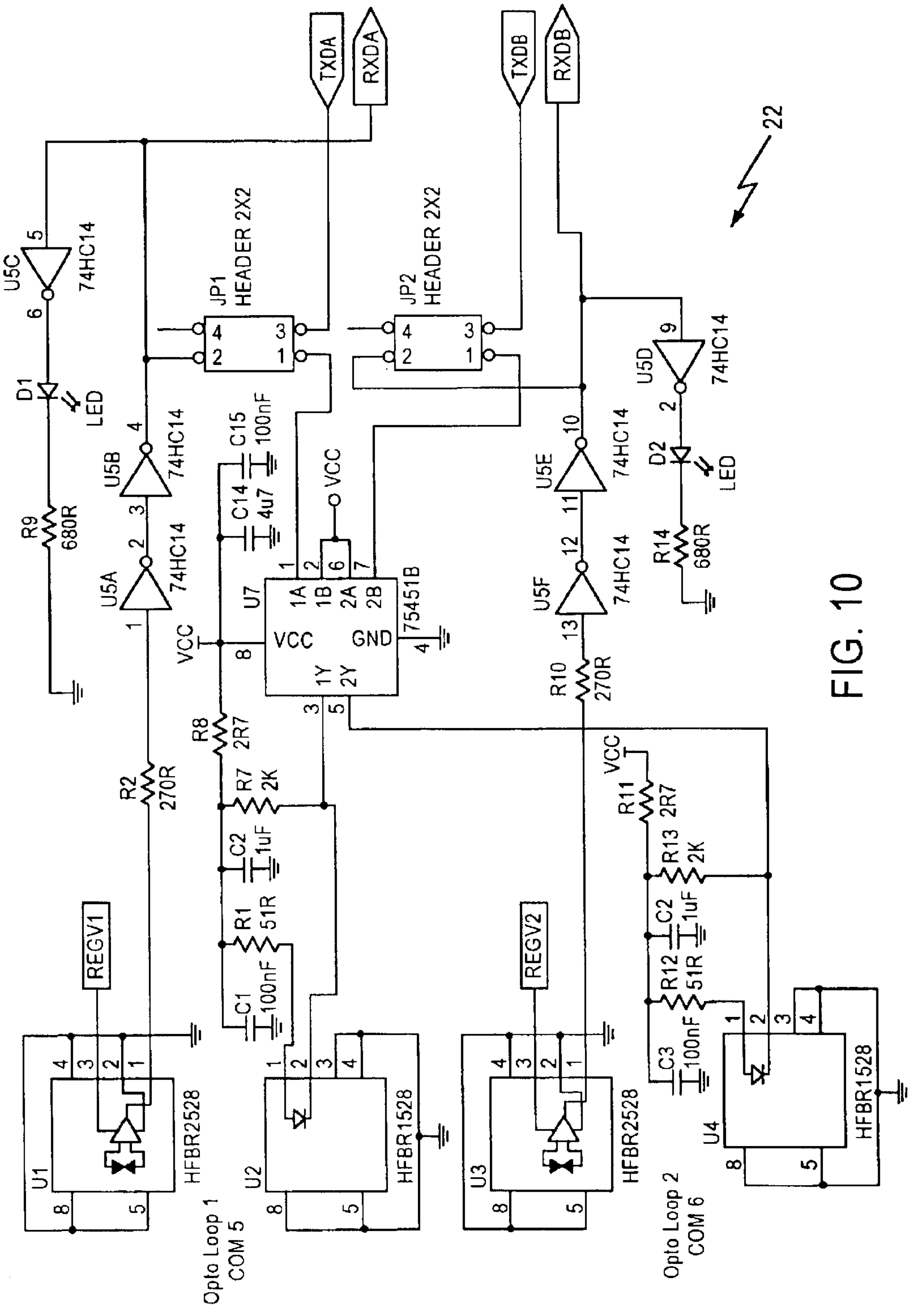
FIG. 10 is a schematic circuit diagram of the fiber optic communication module used with the processor board of FIG. 8.

FIG. 10 is a schematic circuit diagram of the fibre optic communication module 22 that is incorporated into the processor board 11. The fibre optic communication module 22 provides two fibre optic ports COM5, COM6 and either one or both of these ports can be linked to a Site Controller 30 and EGMs 40. The fibre optic ports COM5, COM6 interface with the processor board 11 via the Philips SCC2692AC1A44 UART (see FIG. 8).

Figure 11:
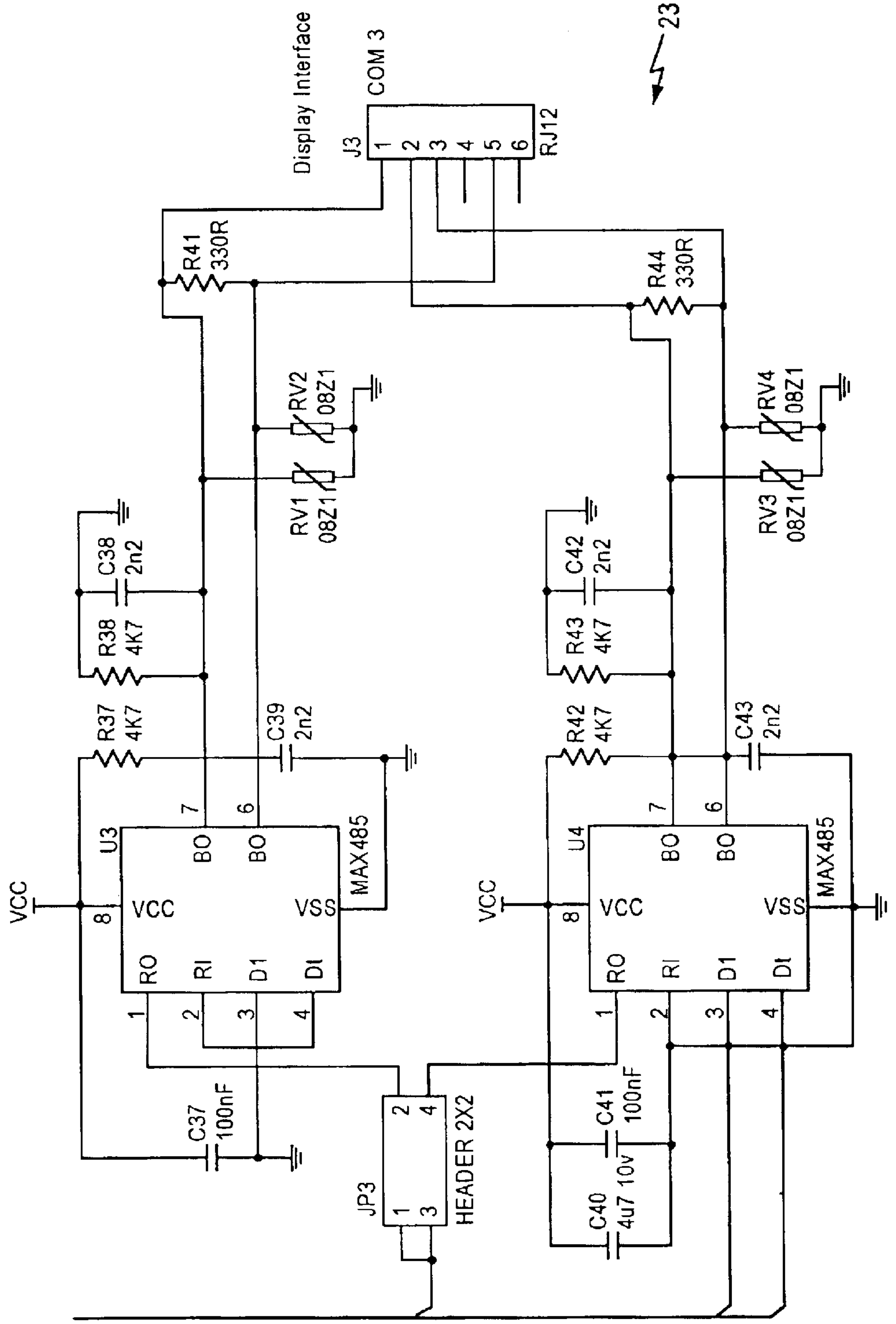
FIG. 11 is a schematic circuit diagram of the display module used with the processor board of FIG. 8.

FIG. 11 is a schematic circuit diagram of the display module 23 that is incorporated into the processor board 11. The display module 23 enables the processor board 11 to interface with the displays JP0, JP1 via the communication port COM3.

Referring back to FIG. 8, the processor board 11 also has a number of LEDs that enable the status of the VJC 300 to be ascertained at a glance. A first LED functions as the system's "Heartbeat" LED and indicates that the system 10 is running by periodically turning ON and OFF. A second LED indicates that the VJC 300 has completed its boot sequence. A third LED indicates the VJC 300 is online and enabled.

The power board 12 illustrated in FIG. 6 supplies power to the processor board 11 and the network board 13. The power board 12 derives its power from a plug pack (not referenced) that is rated to supply 9 VDC at >500 mA.

Figure 12:
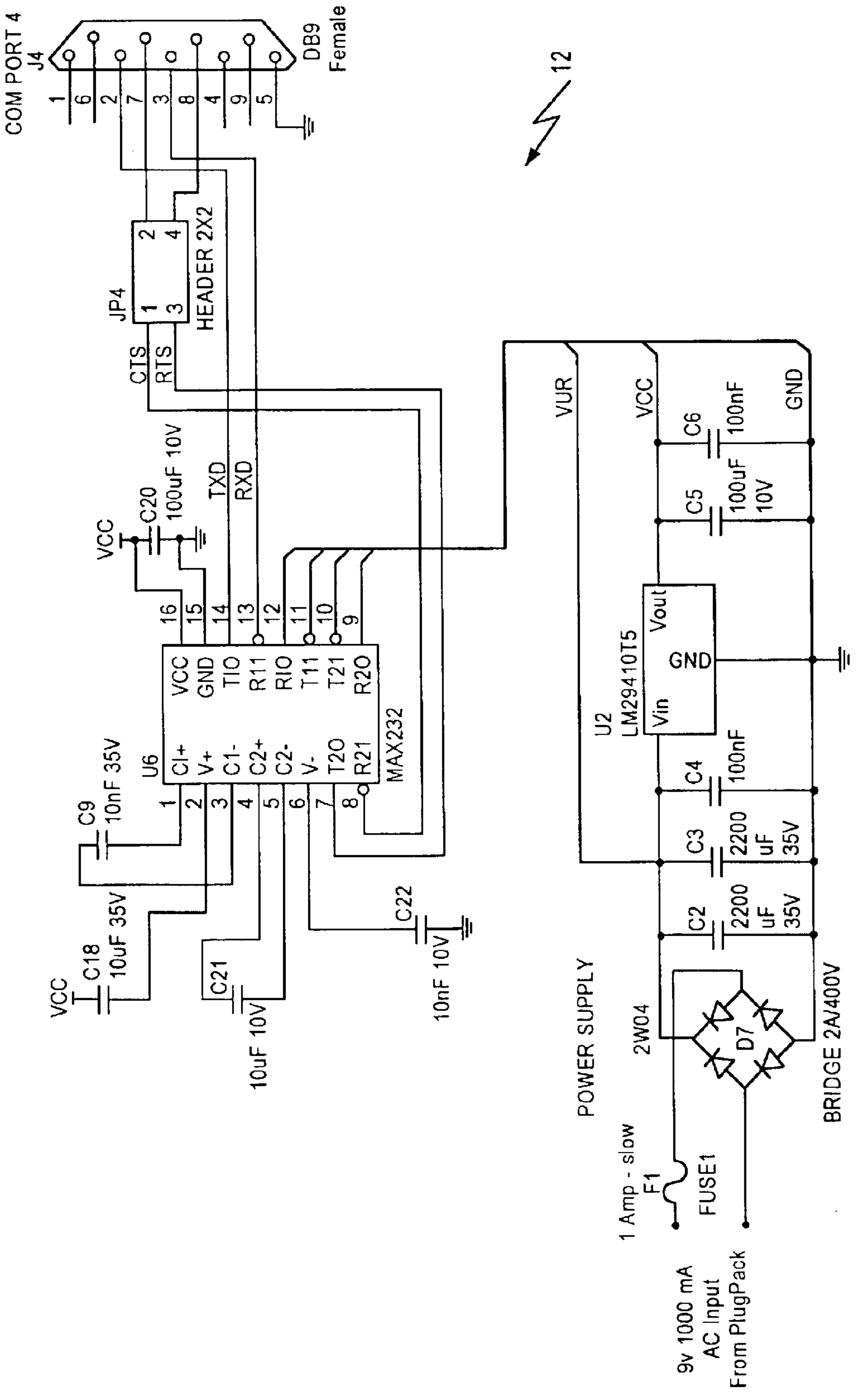
FIG. 12 is a schematic diagram of a portion of the power board used in the Central Jackpot Controller (CJC) and the Venue Jackpot Controller (VJC) according to an embodiment of the invention.
Figure 13A:
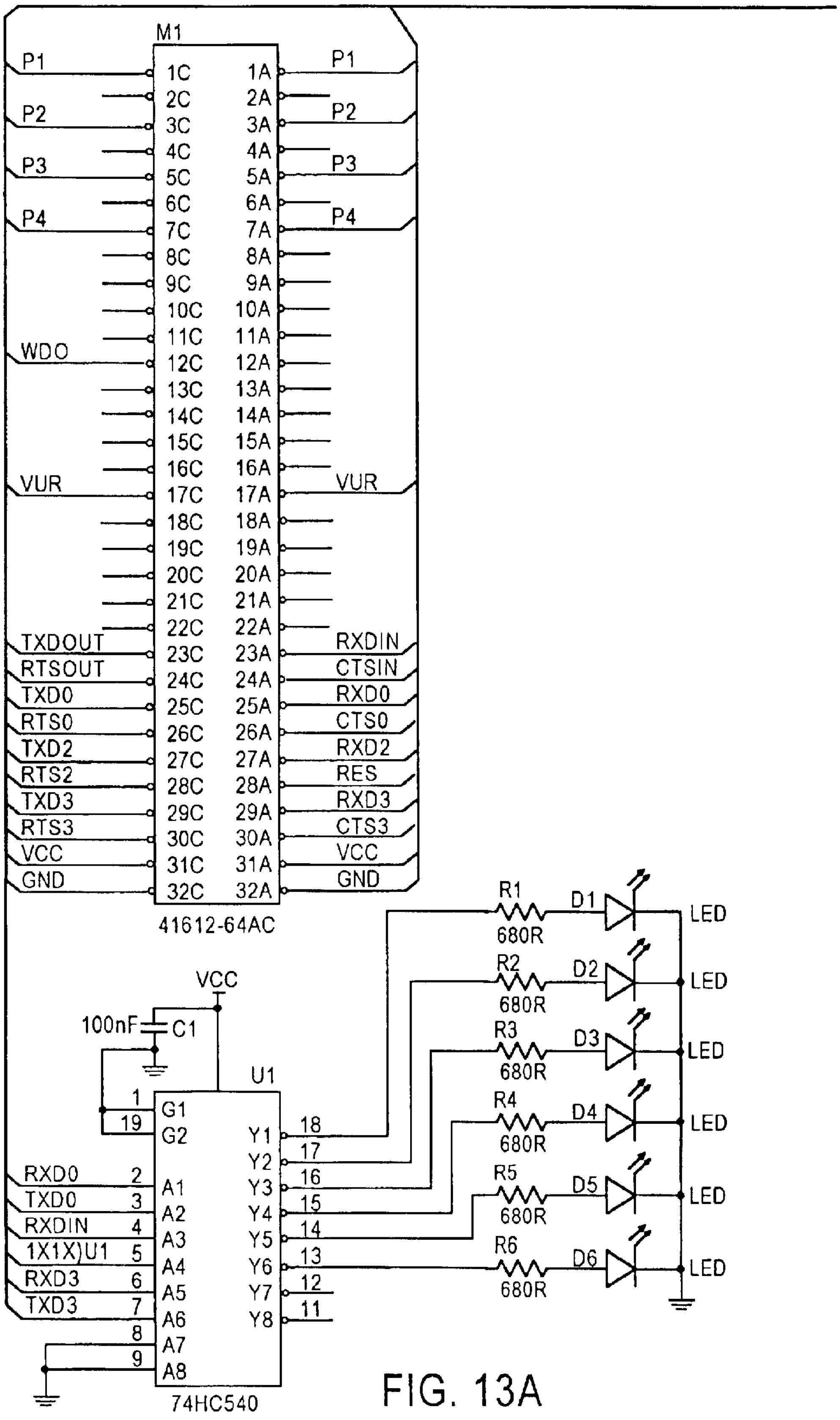
FIG. 13 is a schematic diagram of the communications module used with the power board of FIG. 12.
Figures 13, 13B:
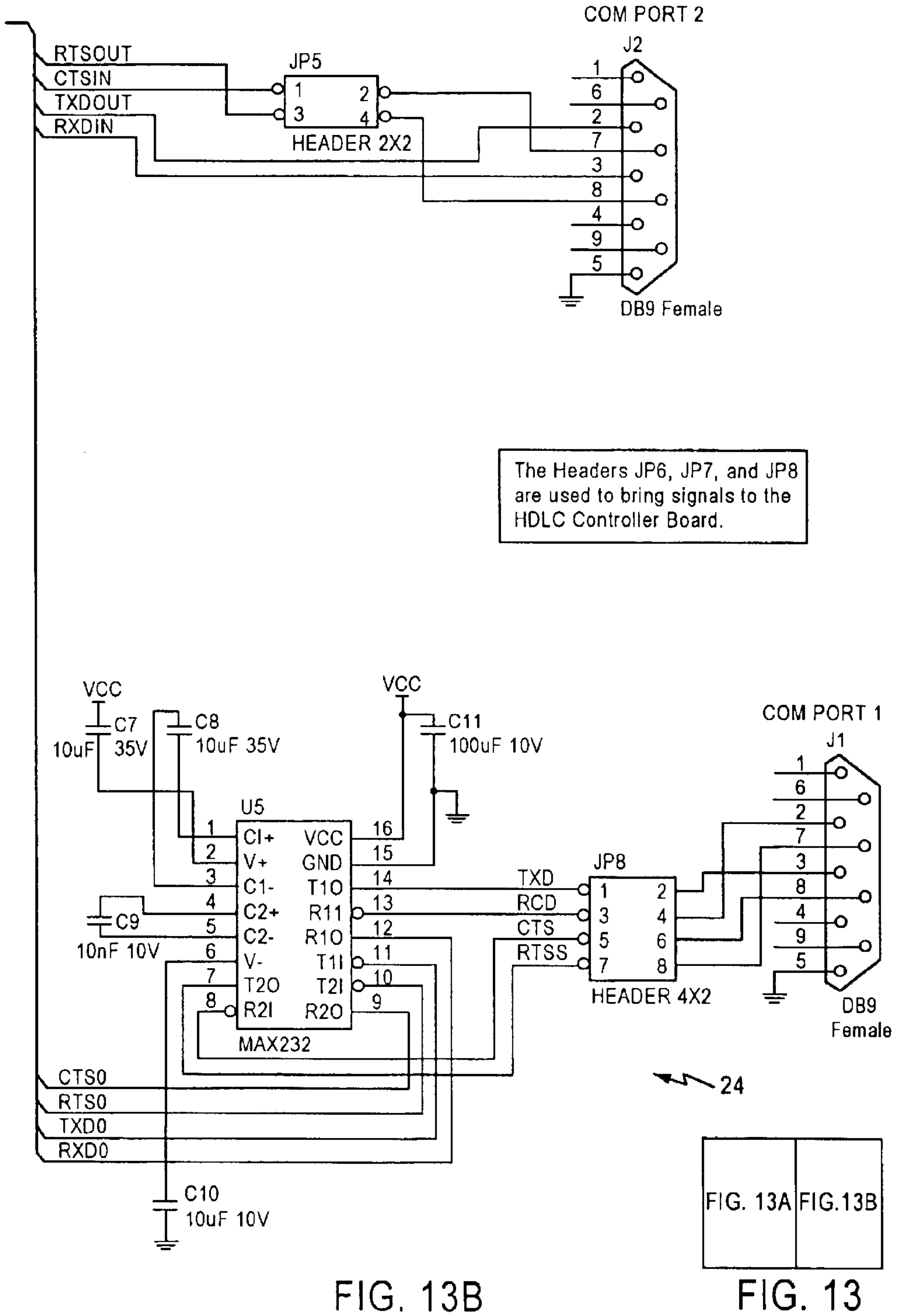

FIGS. 12 and 13 are schematic circuit diagrams of the power Aboard 12. The power board 12 includes a bridge rectifier D7, some filtering Capacitors C2–C6 and a 5 VDC voltage regulator U2. These components provide the regulated 5 VDC voltage required by the power board 12, Processor board 11 and the network board 13. In addition to supplying power to the various circuit boards contained within the VJC 300, the power board 12 also provides three communication ports, namely COM1, COM2 and COM4. COM1 enables the power board 12 to connect to the network board 13. COM2 enables a PC to be connected to the VJC 300 to monitor the data tables that are stored within the VJC 300. COM 4 is used to program the VJC 300.

Figure 15:
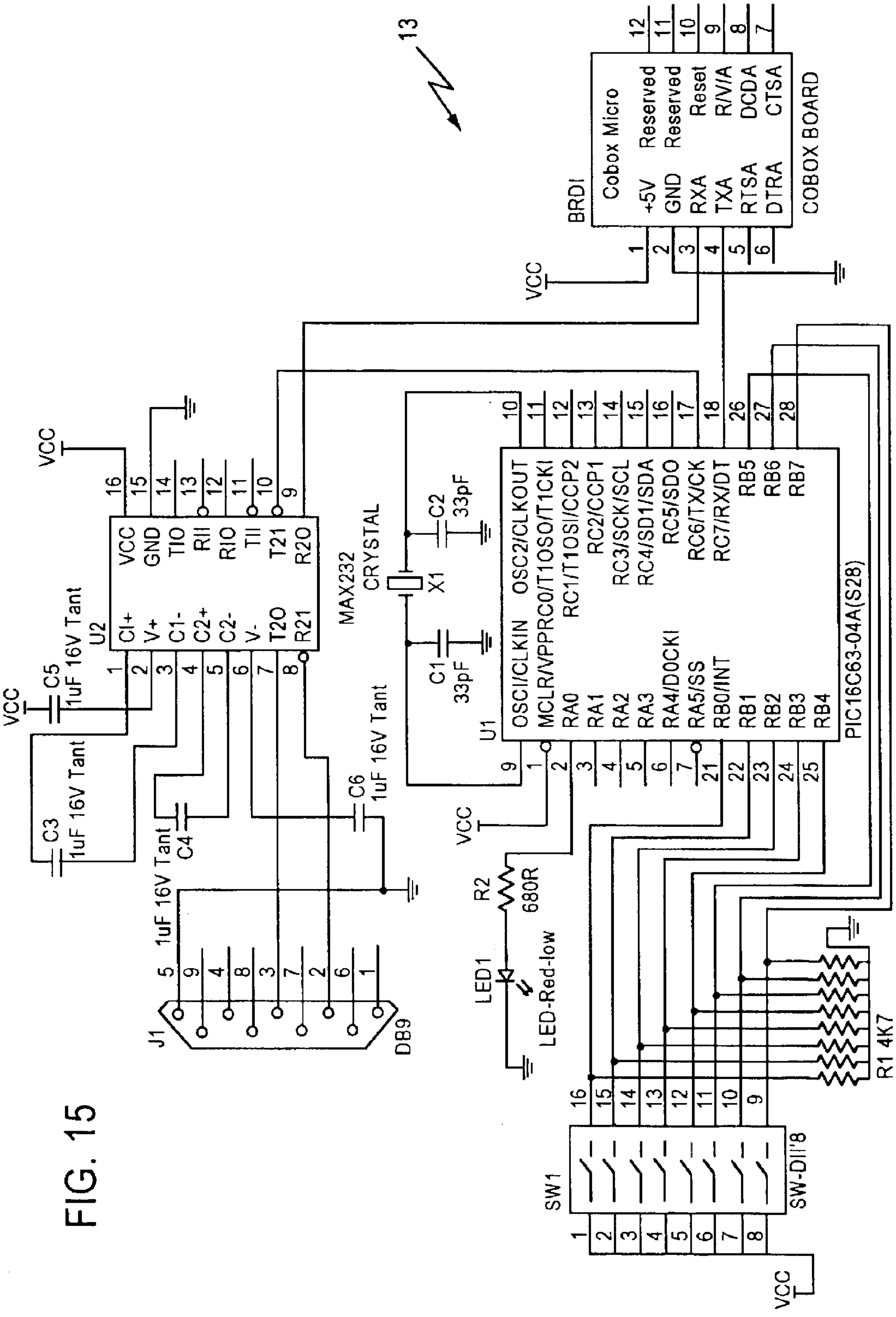
FIG. 15 is a schematic diagram of the network board used in the Central jackpot Controller (CJC) and the Venue Jackpot Controller (VJC) according to an embodiment of the invention.

FIG. 15 is a schematic diagram of the network board 13 used in the VJC 300. The network board 13 is designed to interface the VJC 300 to the network 20, which is a TCP/IP network.

In summary, the communication ports of the VJC 300 are COM1 through to COM6. The functionality of each of the communication ports is as follows:

COM1—This port is a full duplex RS232 communication port having a maximum baud rate of 115,200 bd. This port is used to connect the VJC 300 to the network 20 via the network board 13.

COM2—This port is a full duplex RS232 communication port having a maximum baud rate of 115,200 bd. This port is used as a debugging port during development and enables setup and fault finding during actual operation of the VJC 300.

COM3—This port is a full duplex RS422 communication port having a maximum baud rate of 38,400 bd. This port is used to connect the VJC 300 to the displays JP0 and JP1.

COM4—This port is a full duplex RS232 communication port having a maximum baud rate of 38,400 bd. During development, this port is used to upload system parameters to the VJC 300 and is not used during actual operation of the VJC 300.

COM5, COM6—These two ports are identical and are both fibre optic ports. They conform to the Hewlett Packard VersaLink system.

Figure 7:
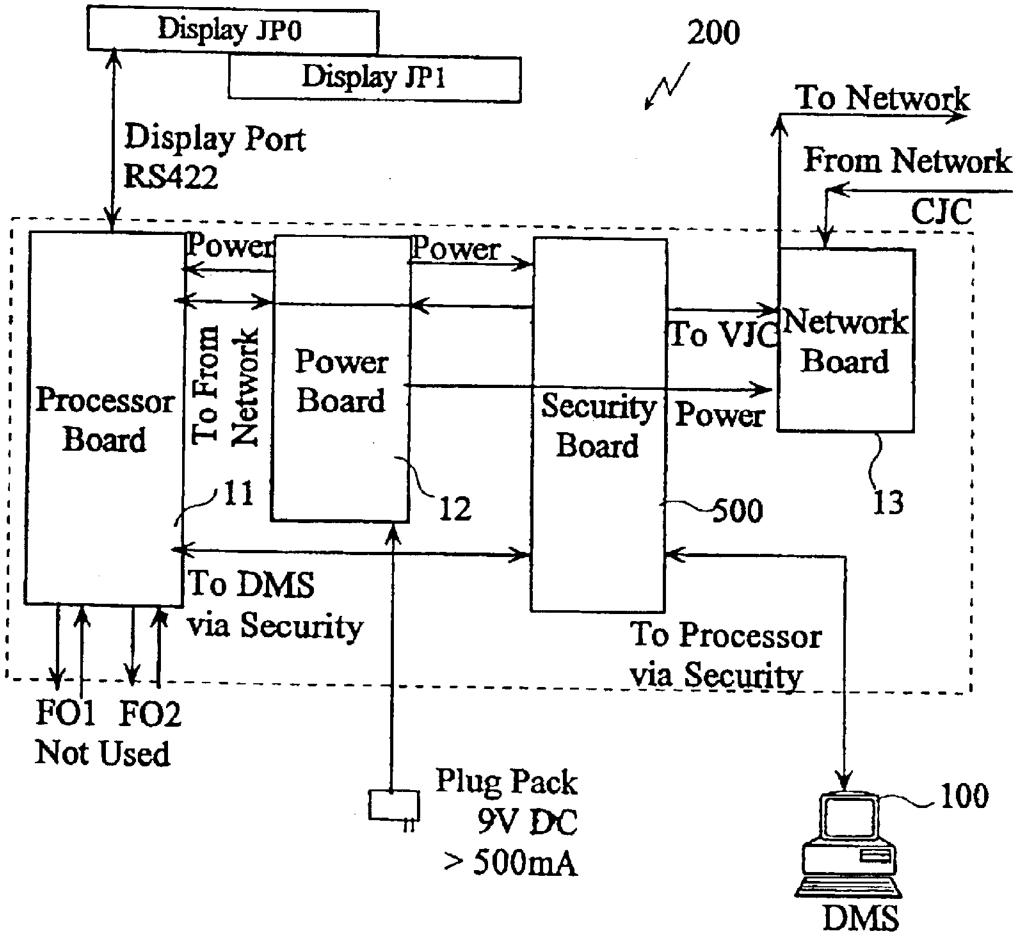
FIG. 7 is a detailed block diagram of the Central jackpot Controller (CJC) illustrated in FIG. 5.

FIG. 7 illustrates the CJC 200 of FIG. 5 in greater detail. In particular, FIG. 7 illustrates the different circuit boards from which the CJC 200 is composed. The circuit boards include a processor board 11, power board 12, security board 500 and a network board 13.

The processor board 11 used in the CJC 200 is identical to the processor board 11 that was previously described in connection with the VJC 300.

The DIP switch (see FIG. 8) on the processor board 11 is not used by the CJC 200. Also, the fibre optic ports COM5, COM6 (see FIG. 10) are only used by the CJC 200 to connect to a standby CRC 200 (see FIG. 5 which illustrates a fully redundant CJC 200).

Displays JP0 and JP1 connect to the processor board 11 via the communication port COM3 of the display module 23 illustrated in FIG. 11.

Referring back to FIG. 8, a number of the LEDs on the processor board 11 enable the status of the CJC 200 to be ascertained at a glance. A first LED functions as the systems "Heartbeat" LED and indicates that the system 10 is running by periodically turning ON and OFF. A second LED indicates that the CJC 200 is running normally. A third LED turns ON and OFF once every six seconds to indicate that the 6-second polling cycle is being performed. The length of ON time compared to OFF time of the third LED provides an indication of the CJC 200 transmit to non-transmit ratio. A fourth LED indicates whether any of the security features associated with the CJC 200 are turned ON or OFF. When the fourth LED is OFF, the security features are ON. When the fourth LED is ON, the security features are not fully ON and alterations may be made to the CJC 200.

The power board 12 used in the CJC 200 is identical to the power board 12 that was previously described in connection with the VJC 300. However, in addition to providing the regulated 5 VDC voltage required by the power board 12, processor board 11 and the network board 13 the power board 12 in the CJC 200 also powers the security board 500. COM1 enables the power board 12 to connect to the network board 13. COM2 connects to the security board 500. COM4 is used to program the CJC 200.

Figure 14A:
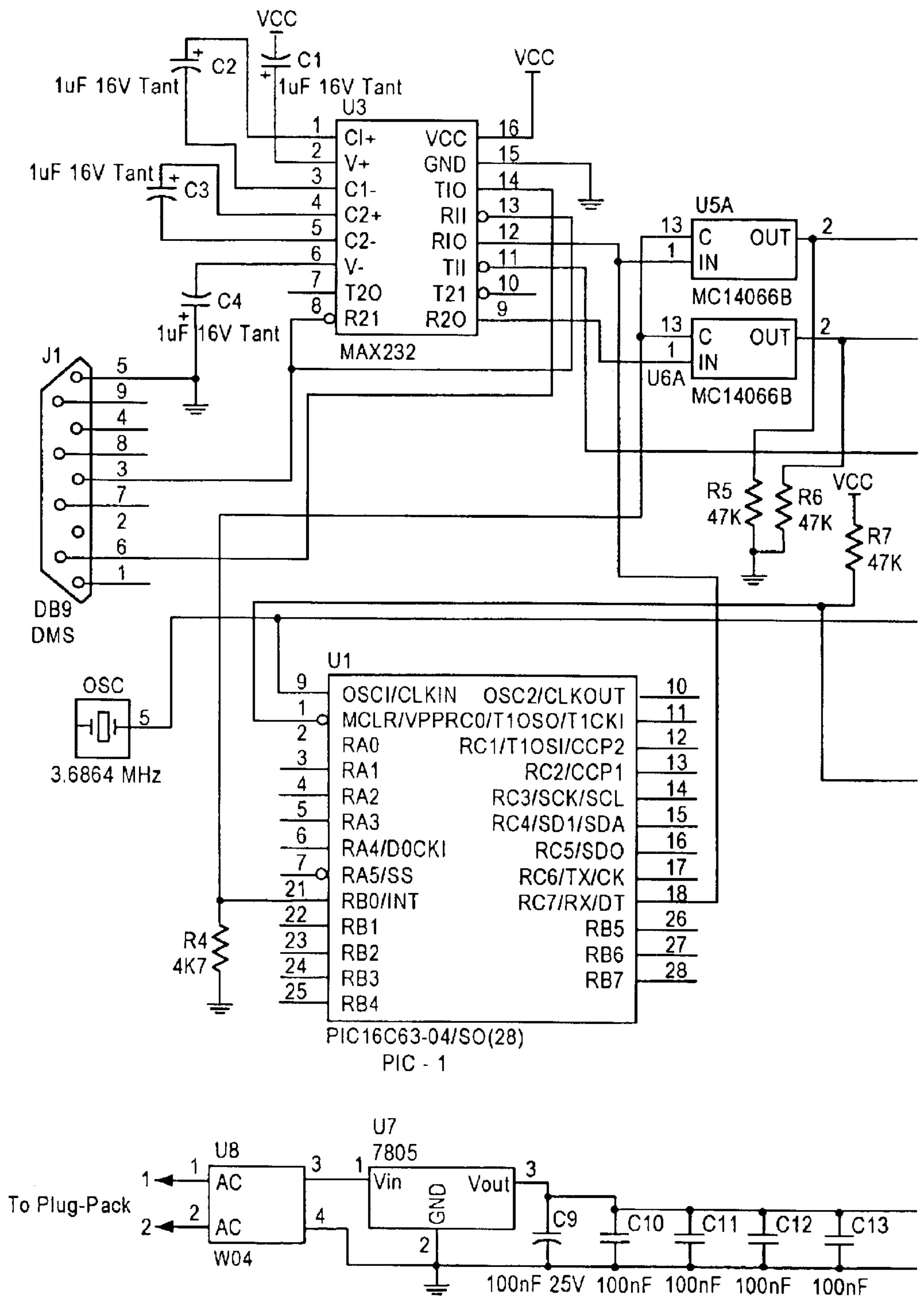
FIG. 14 is a schematic diagram of the security board used in the Central Jackpot Controller (CJC) according to an embodiment of the invention.
Figure 14B:
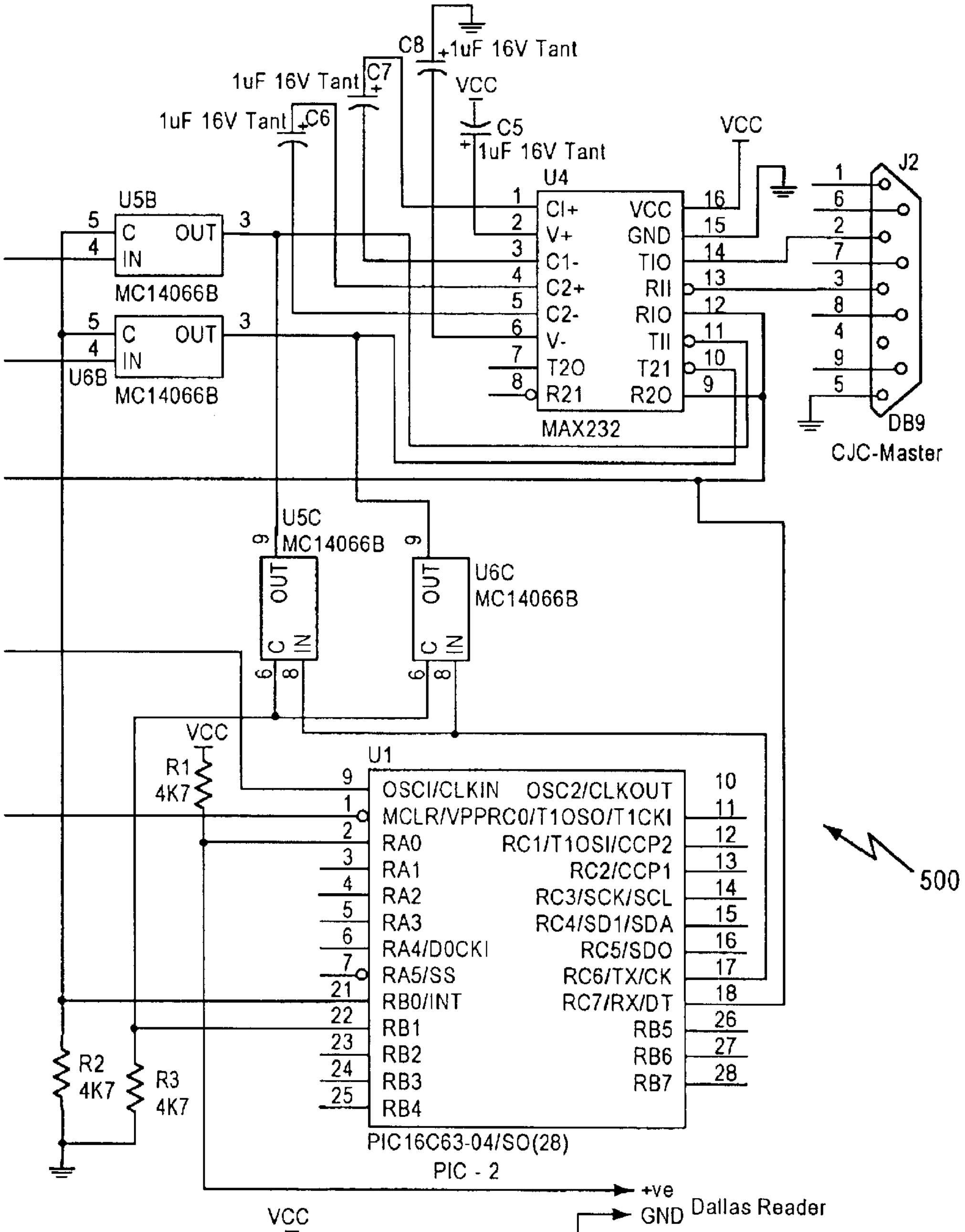
Figure 14:
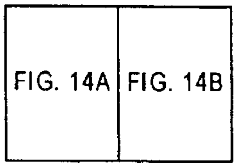

FIG. 14 is a schematic diagram of the security board 500 used in the CJC 200. The security board 500 essentially consists of two microprocessors U1 and U2 that monitor communications between the CJC 200 and the DMS 100 so that only valid information is allowed to pass between the two. If a message to be passed from the DMS 100 to the CJC 200 is valid, the message is passed on. If a message to be passed between the DMS 100 and the CJC 200 is invalid, the message is discarded.

A message is valid when a valid password key (not shown) is inserted into a password key reader (not shown) that communicates with the security board 500. The microprocessors U1, U2 read the password key every 100 ms. Therefore, the key must remain in place at all times when the DMS 100 is to send commands to the CJC 200, but is not required for messages from the CJC 200 to the DMS 100.

Different password keys may be programmed to provide different levels of access to the system 10. The password keys used in the system 10 are of the Dallas 1991 (touch multikey) ibutton type. Each key is assigned a security level and a key number. The security level indicates the level of access that is permitted to the holder of the key while the key number is assigned to a person. Thus, any alterations that are made to the system 10 using a particular key will be attributed to the person who is assigned as the holder of the key.

The network board 13 used in the CJC 200 is identical to the network board 13 that was previously discussed in connection with the VJC 300. The network board 13 is designed to interface the CJC 200 to the network 20, which is a TCP/IP network.

In summary, the communication ports of the CJC 200 are COM1 through to COM6. The functionality of each of the communication ports is as follows:

COM1—This port is a full duplex RS232 communication port having a maximum baud rate of 115,200 bd. This port is used to connect the CJC 200 to the network 20 via the network board 13.

COM2—This port is a full duplex RS232 communication port having a maximum baud rate of 115,200 bd. This port is used to connect the security board to the CJC 200.

COM3—This port is a full duplex RS422 communication port having a maximum baud rate of 38,400 bd. This port is used to connect the CJC 200 to the displays JP0 and JP1.

COM4—This port is a full duplex RS232 communication port having a maximum baud rate of 38,400 bd. During development, this port is used for debugging and is not used during actual operation of the CJC 200.

COM5, COM6—These two. ports are identical and are both fibre optic ports. They conform to the Hewlett Packard VersaLink standard. These ports can be used by the CJC 200 to connect to a standby CRC 200.

The software flow of the system 10 will now be-discussed with reference to FIGS. 16 to 30.

Figure 16:
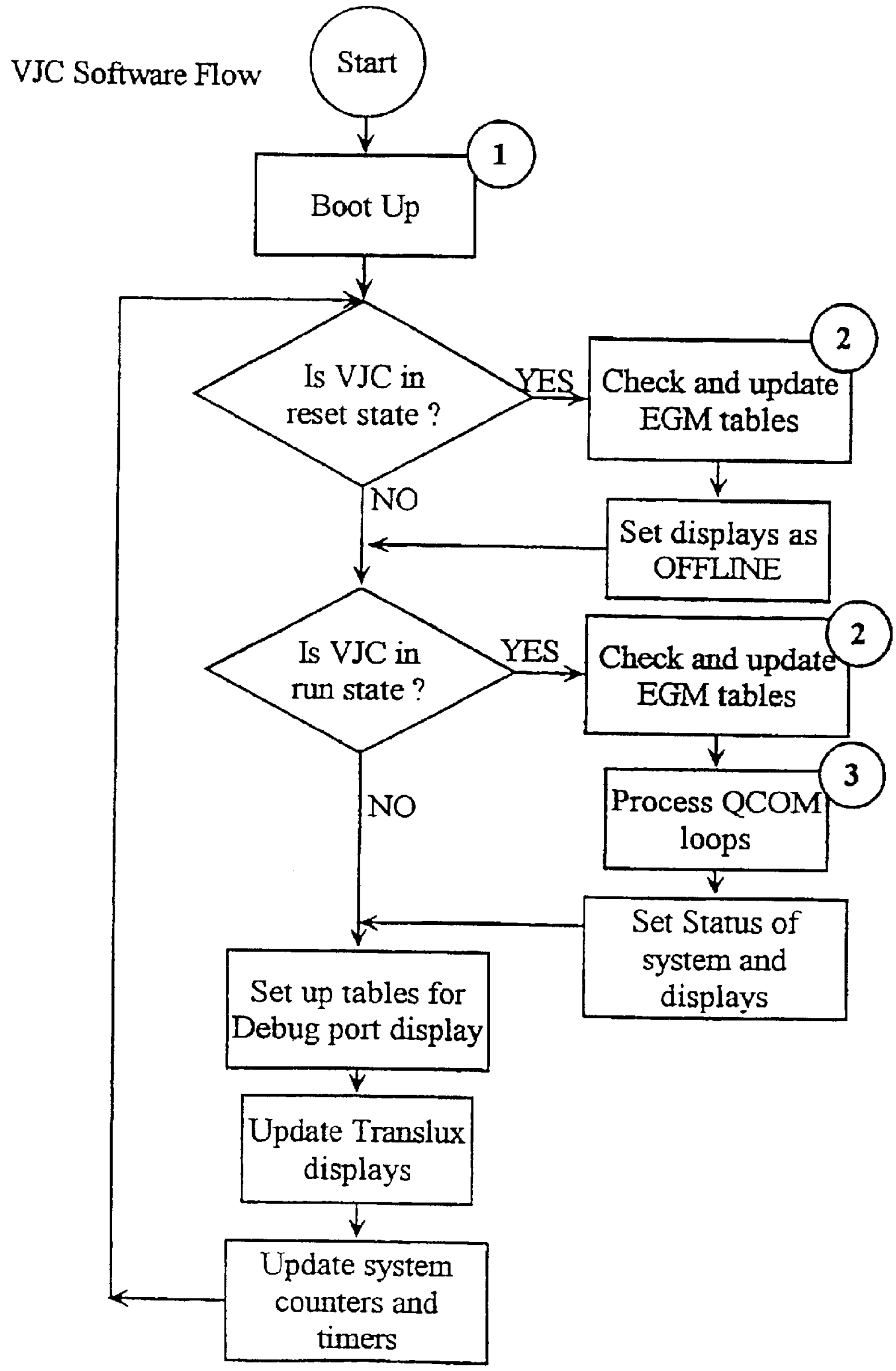
FIG. 16 is a flowchart that illustrates the software flow of the Venue Jackpot Controller (VJC) according to an embodiment of the invention.

FIG. 16 illustrates the major stages in the software flow of the VJC 300.

Figure 17:
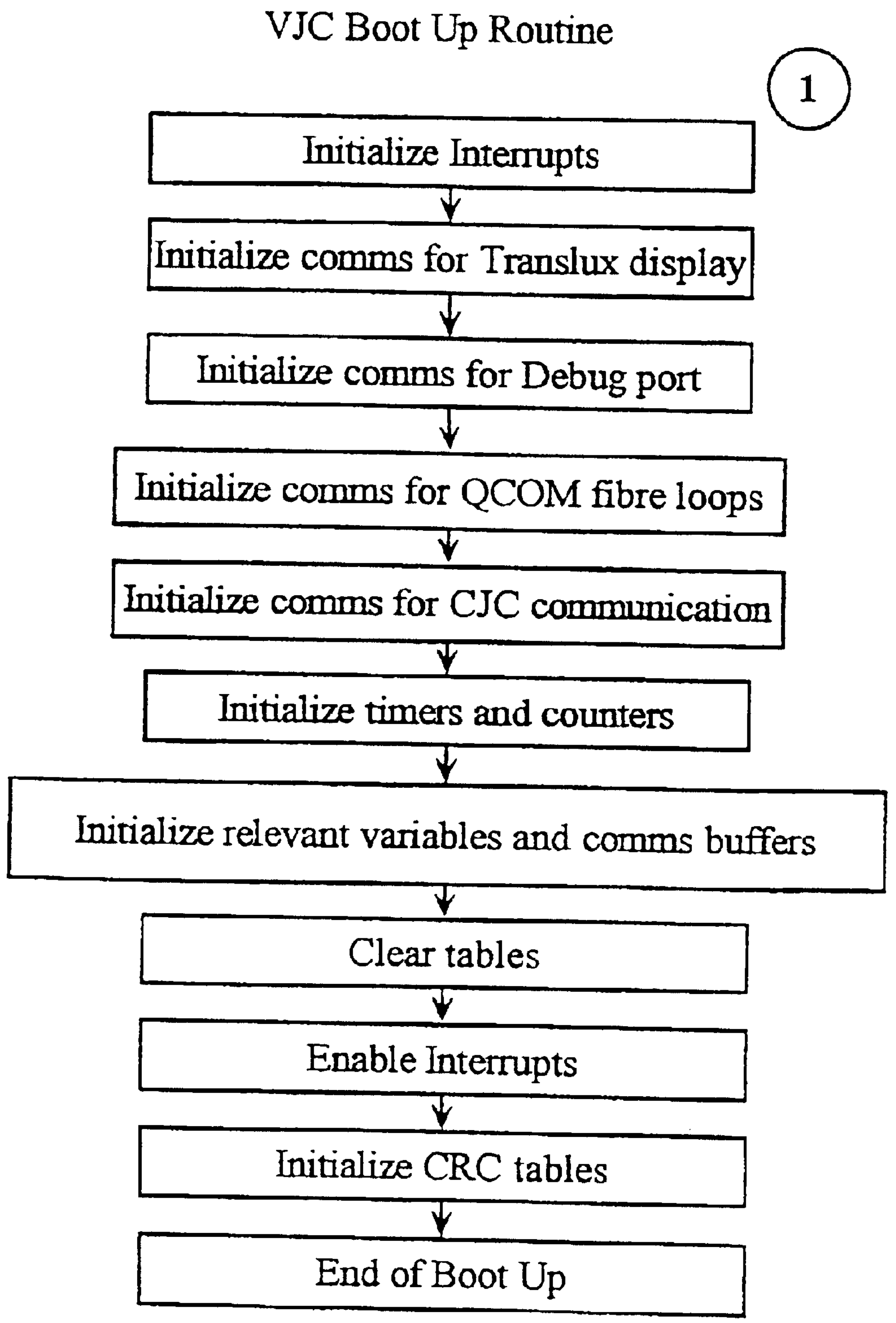
FIG. 17 is a flowchart that illustrates the Boot Up stage referred to in FIG. 16.
Figure 18:
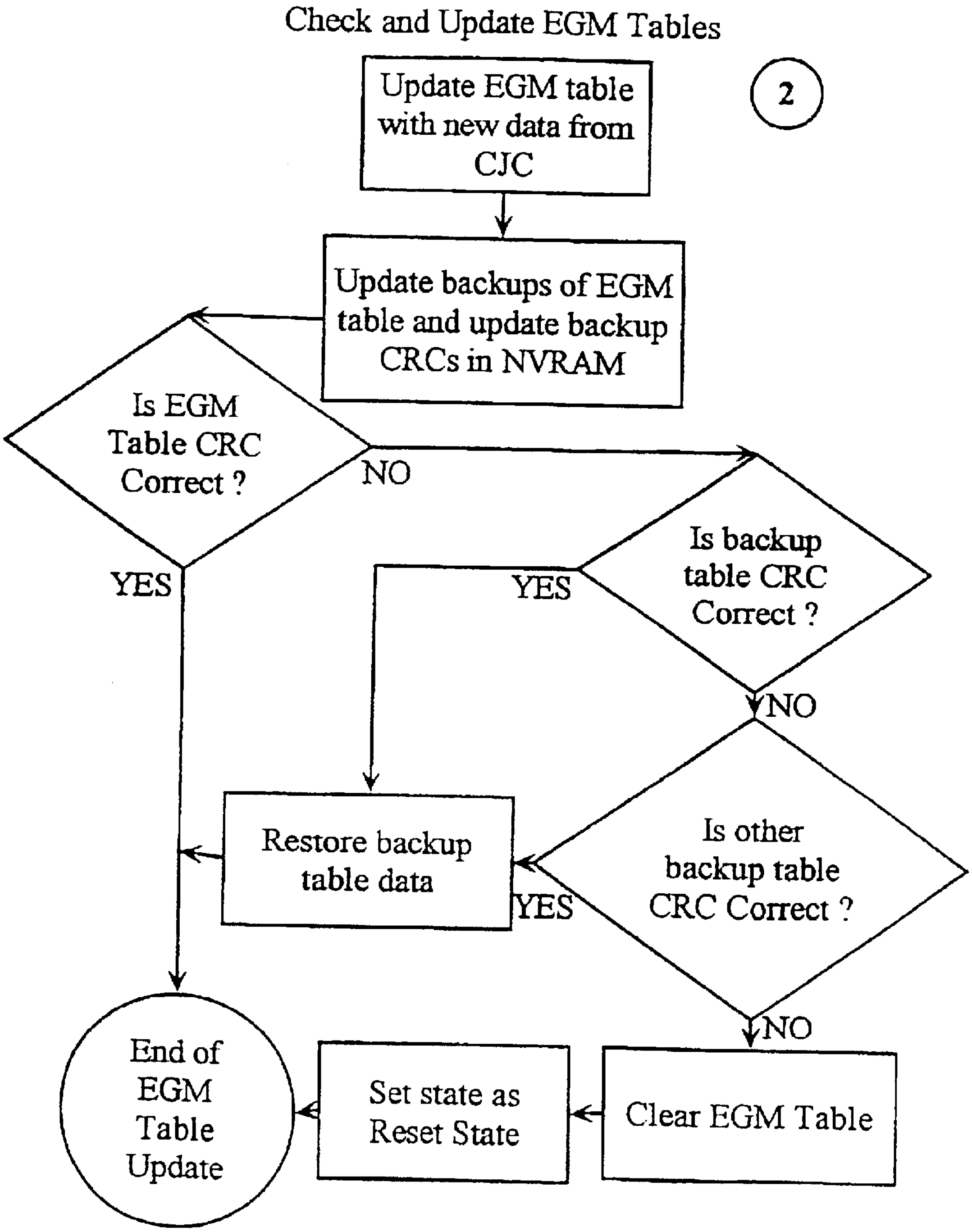
FIG. 18 is a flowchart that illustrates the Check and Update EGM Tables stage referred to in FIG. 16.
Figure 19:
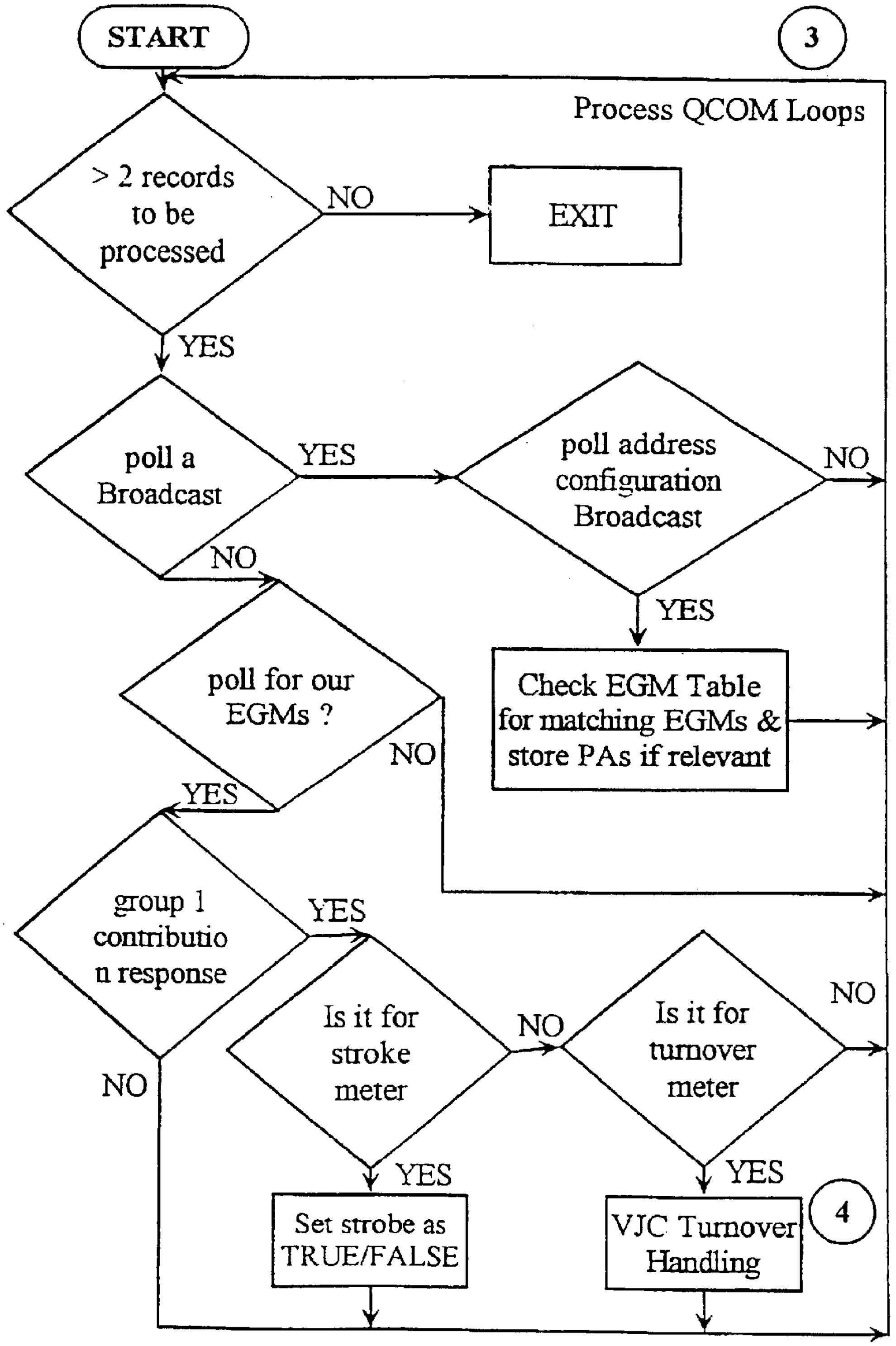
FIG. 19 is a flowchart that illustrates the Process Loops stage referred to in FIG. 16.

The Boot Up, Check and Update EGM Tables, and Process QCOM Loops stages of the VJC 300 software flow referred to in FIG. 16 are expanded upon in FIGS. 17 to 19, respectively.

Figure 20:
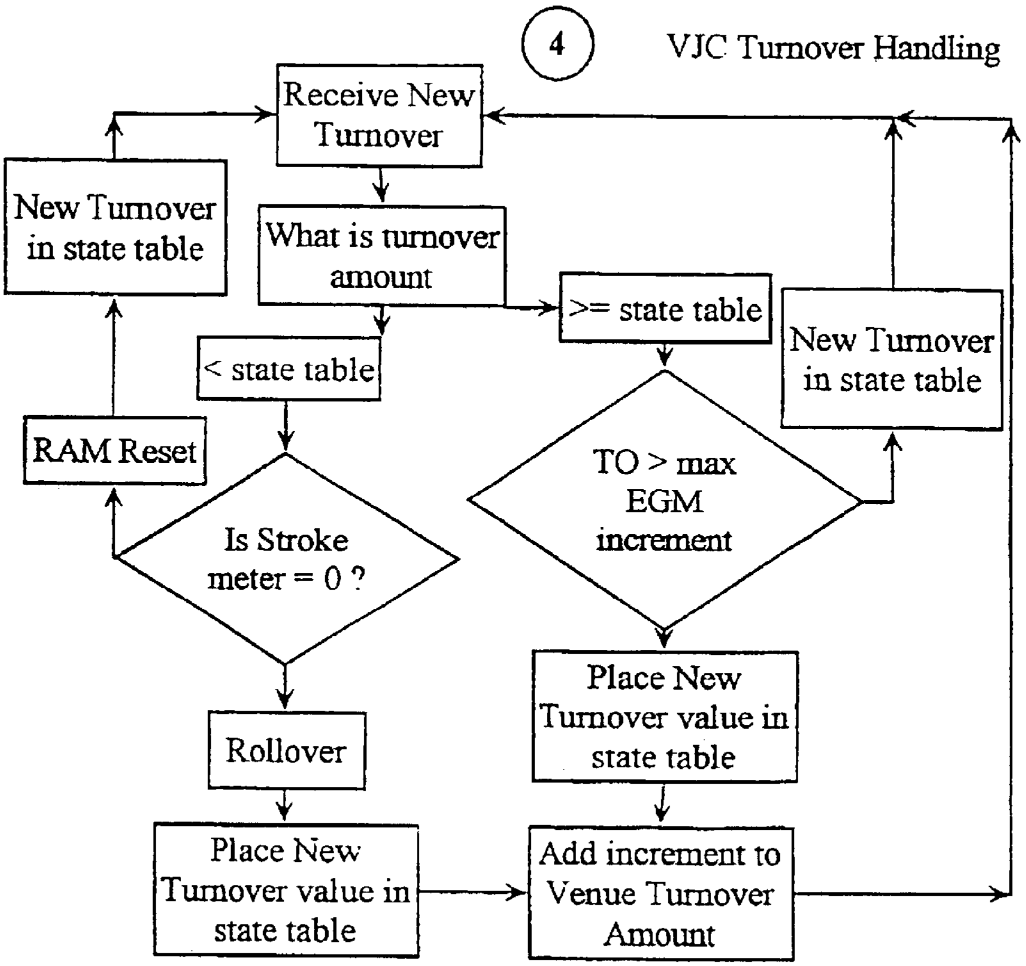
FIG. 20 is a flowchart that illustrates the VJC Turnover Handling stage referred to in FIG. 19.
Figure 22:
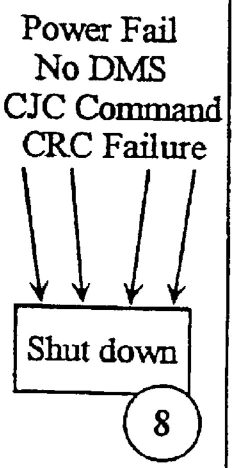
FIG. 22 is a flowchart that illustrates the Shut Down stage of the Jackpot Controller software flow according to an embodiment of the invention.

FIG. 20 expands upon the VJC Turnover Handling stage referred to in FIG. 19.

A reference to Translux displays in FIGS. 16 to 30 is equivalent to a reference to the displays JP0 and JP1. A reference to. EGM tables in FIGS. 16 to 30 is a reference to the data tables contained in the VJCs 300 which store information pertaining to associated EGMs 40. A reference to QCOM loops in FIGS. 16 to 30 is a reference to the fibre optic loops that connect a VJC 300 to any associated EGMs 40.

Figure 21:
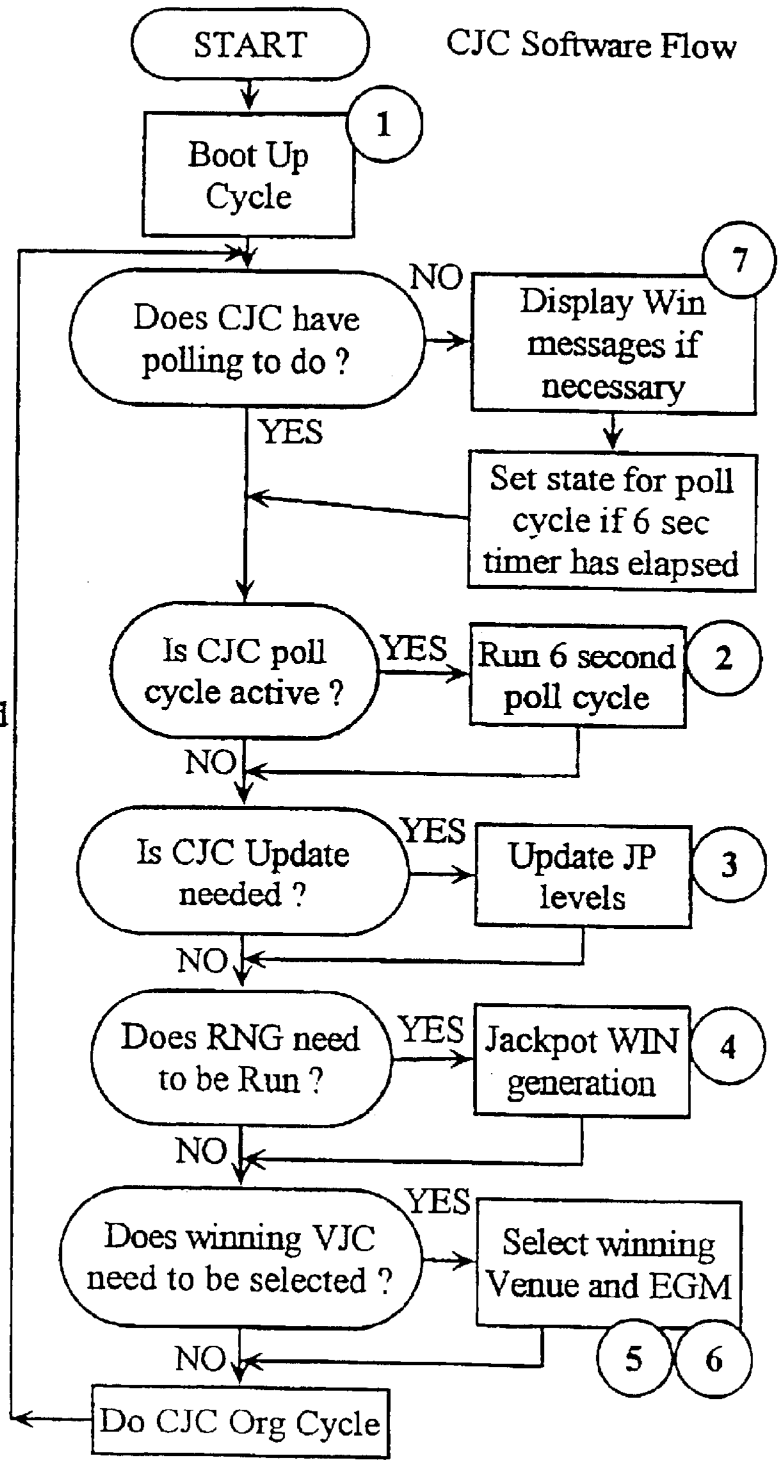
FIG. 21 is a flowchart that illustrates the software of the Central Jackpot Controller (CJC) according to an embodiment of the invention.
Figure 23:
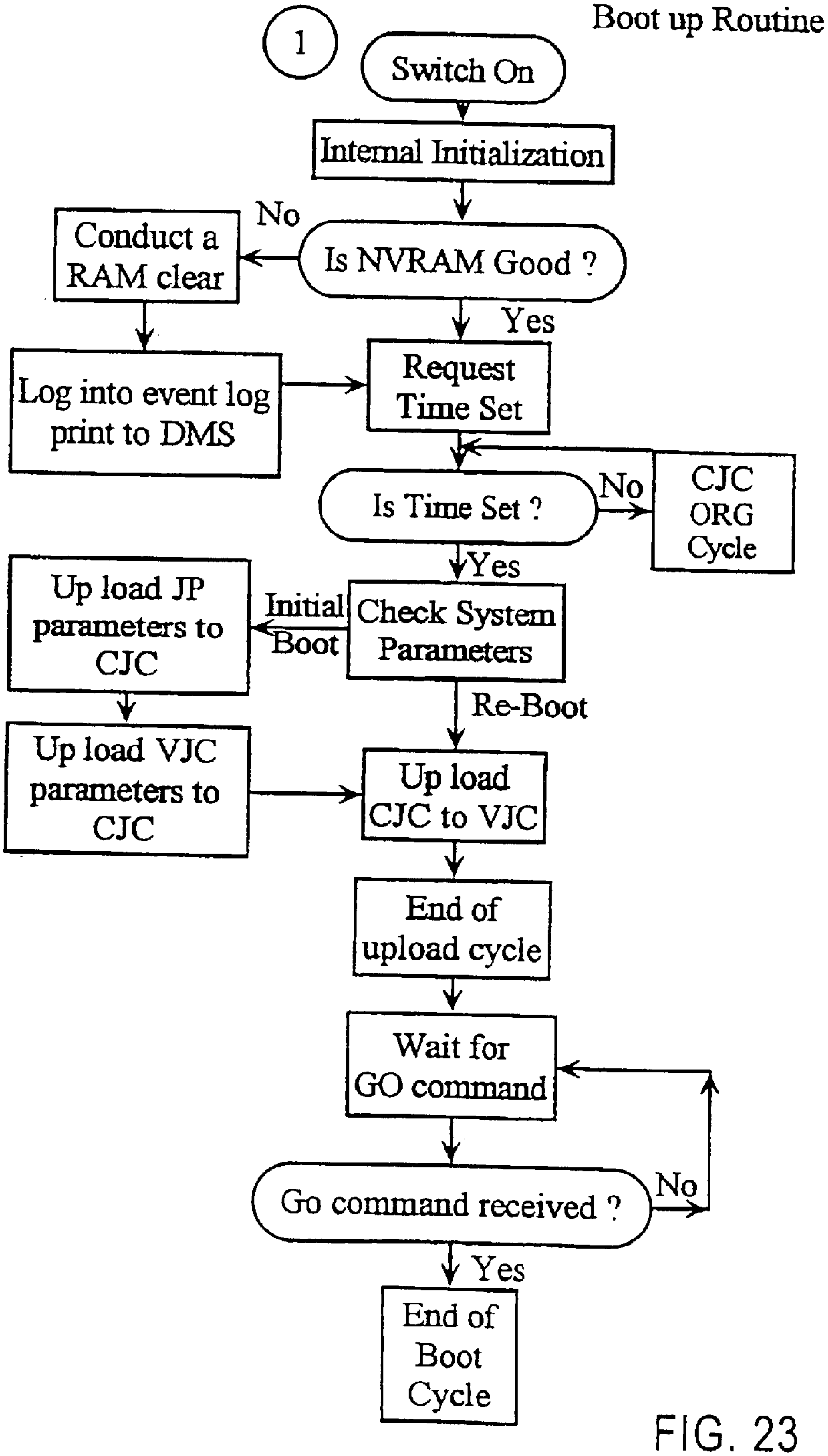
FIG. 23 is a flowchart that illustrates the Boot Up stage referred to in FIG. 21.
Figure 24:
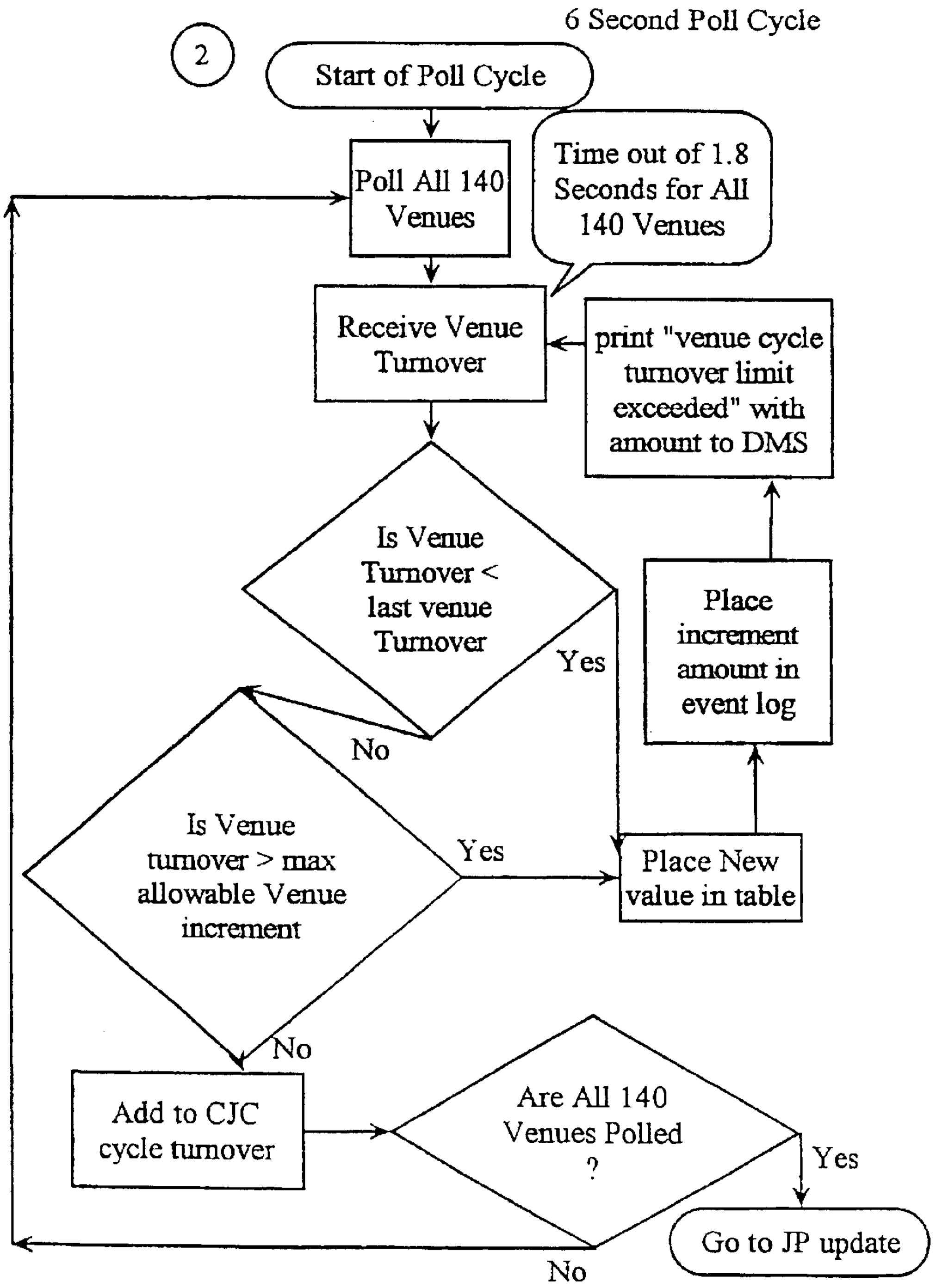
FIG. 24 is a flowchart that illustrates the 6 Second Poll Cycle stage referred to in FIG. 21.
Figure 25:
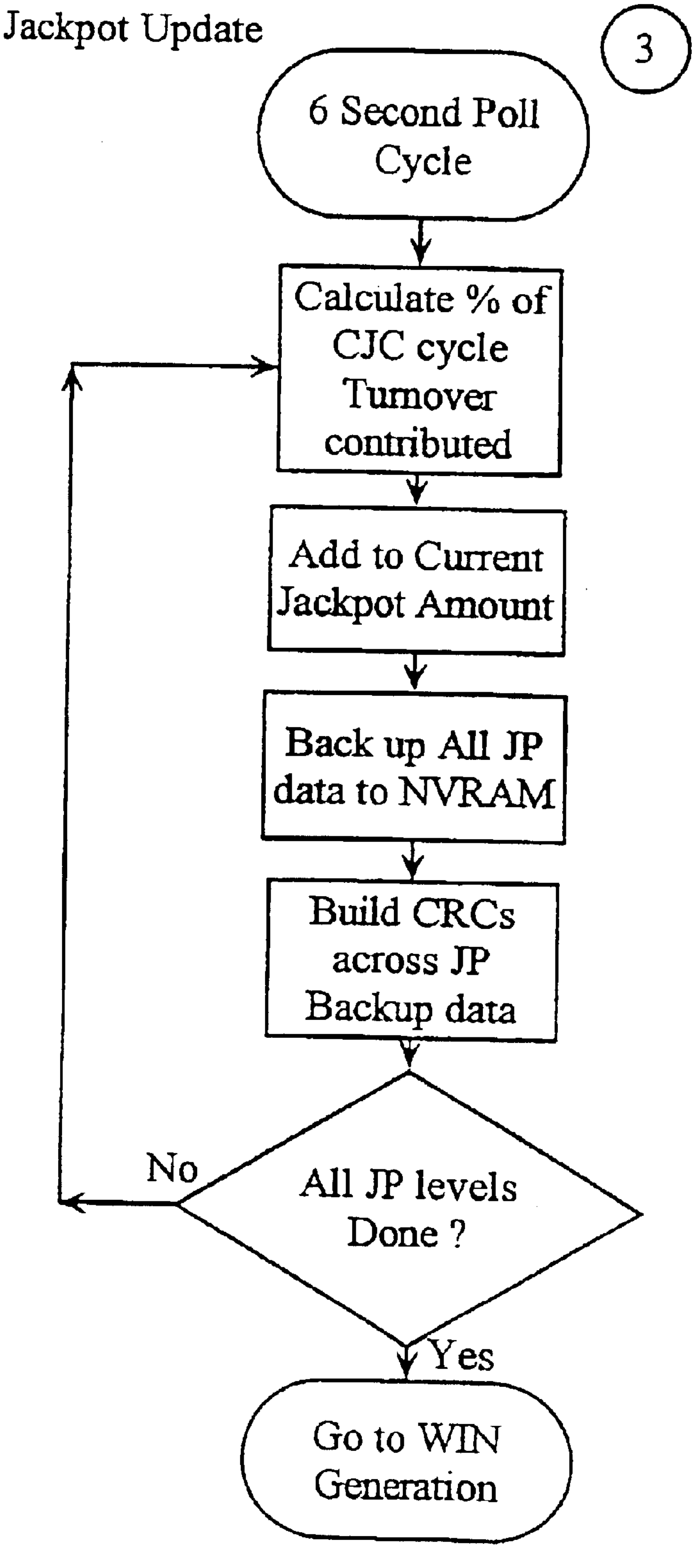
FIG. 25 is a flowchart that illustrates the Update Jackpot Levels stage referred to in FIG. 21.
Figure 26:
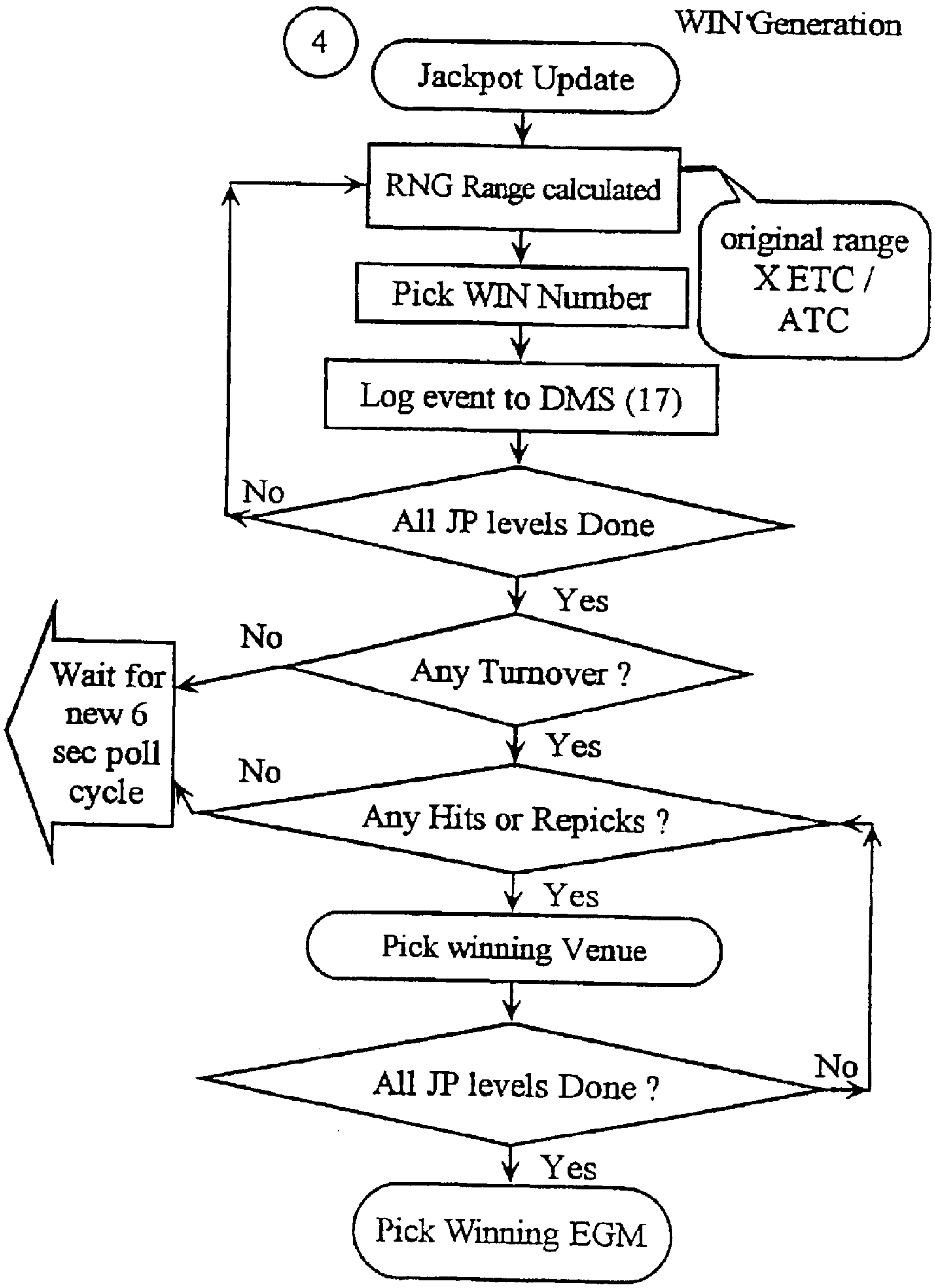
FIG. 26 is a flowchart that illustrates the Jackpot WIN Generation stage referred to in FIG. 21.
Figure 27:
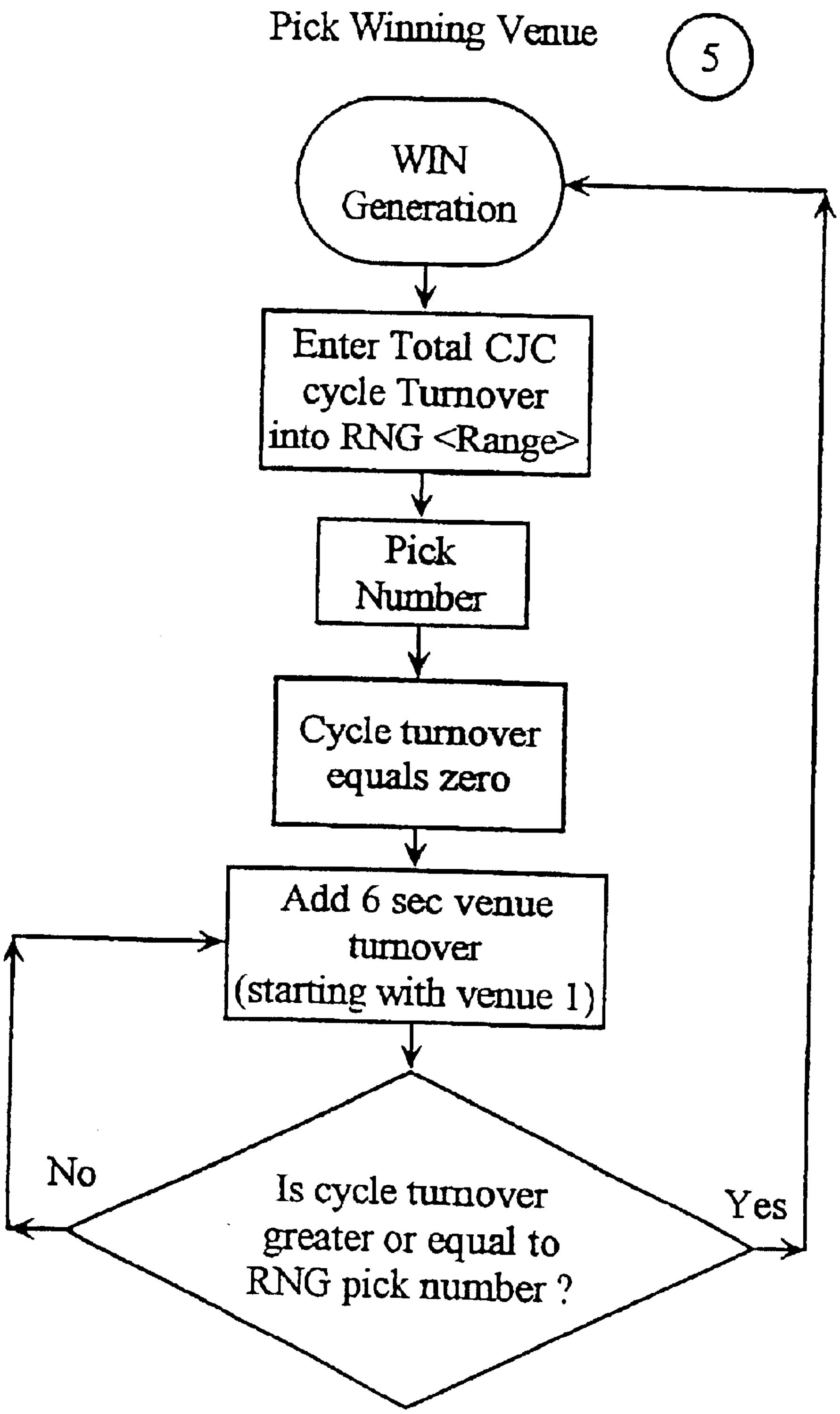
FIG. 27 is a flowchart that illustrates the Select Winning Venue stage referred to in FIG. 21.
Figure 28:
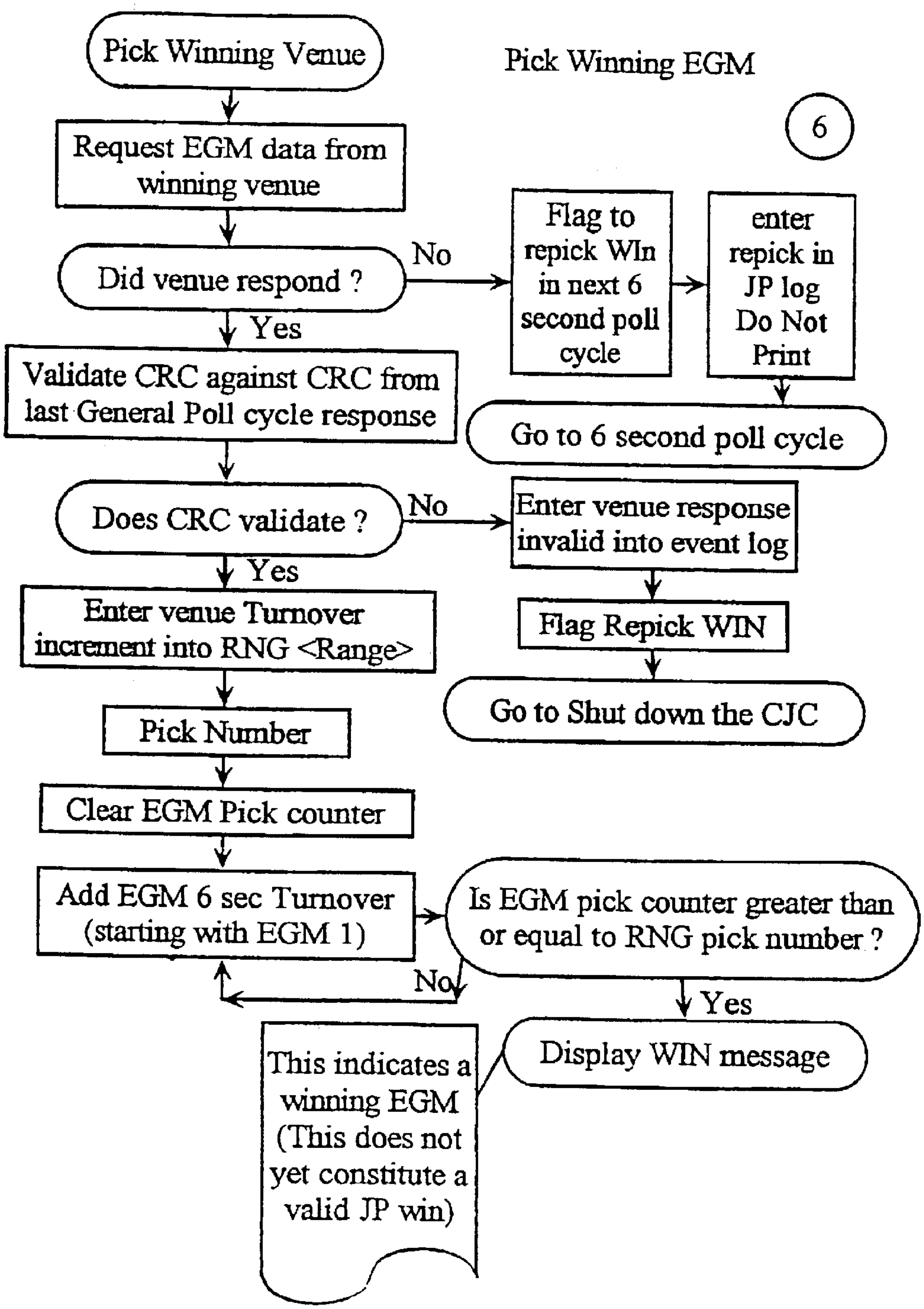
FIG. 28 is a flowchart that illustrates the Select Winning EGM stage referred to in FIG. 21.
Figure 29:
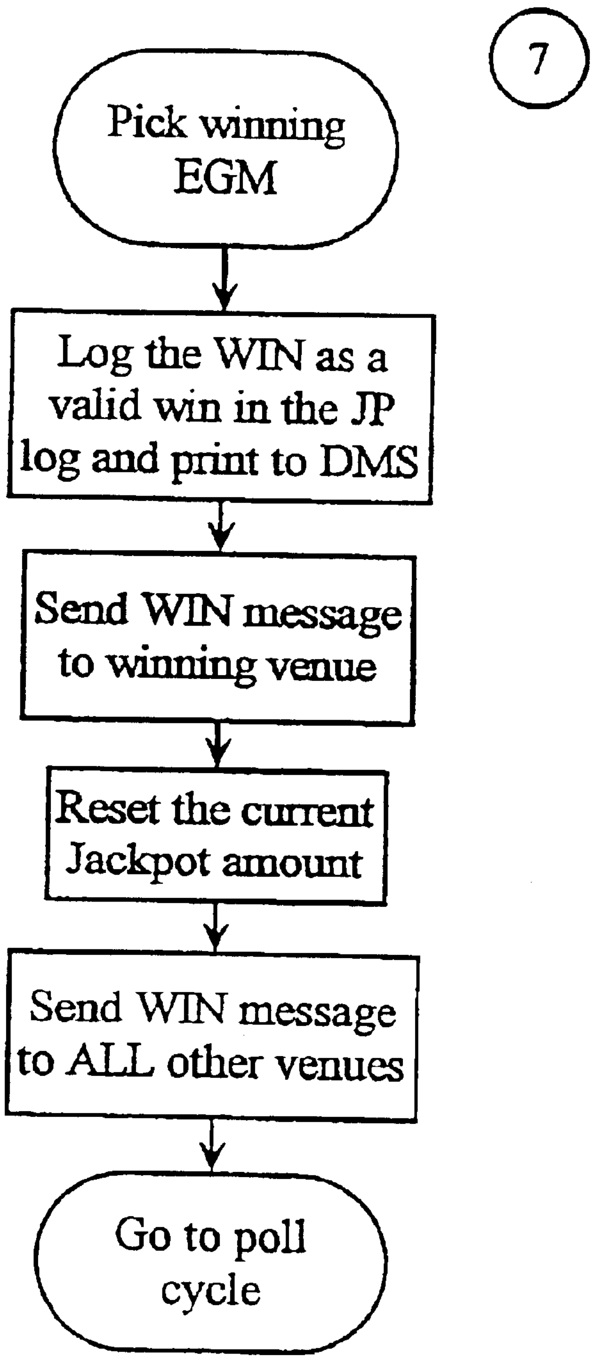
FIG. 29 is a flowchart that illustrates the Display WIN Message stage referred to in FIG. 21.
Figure 30:
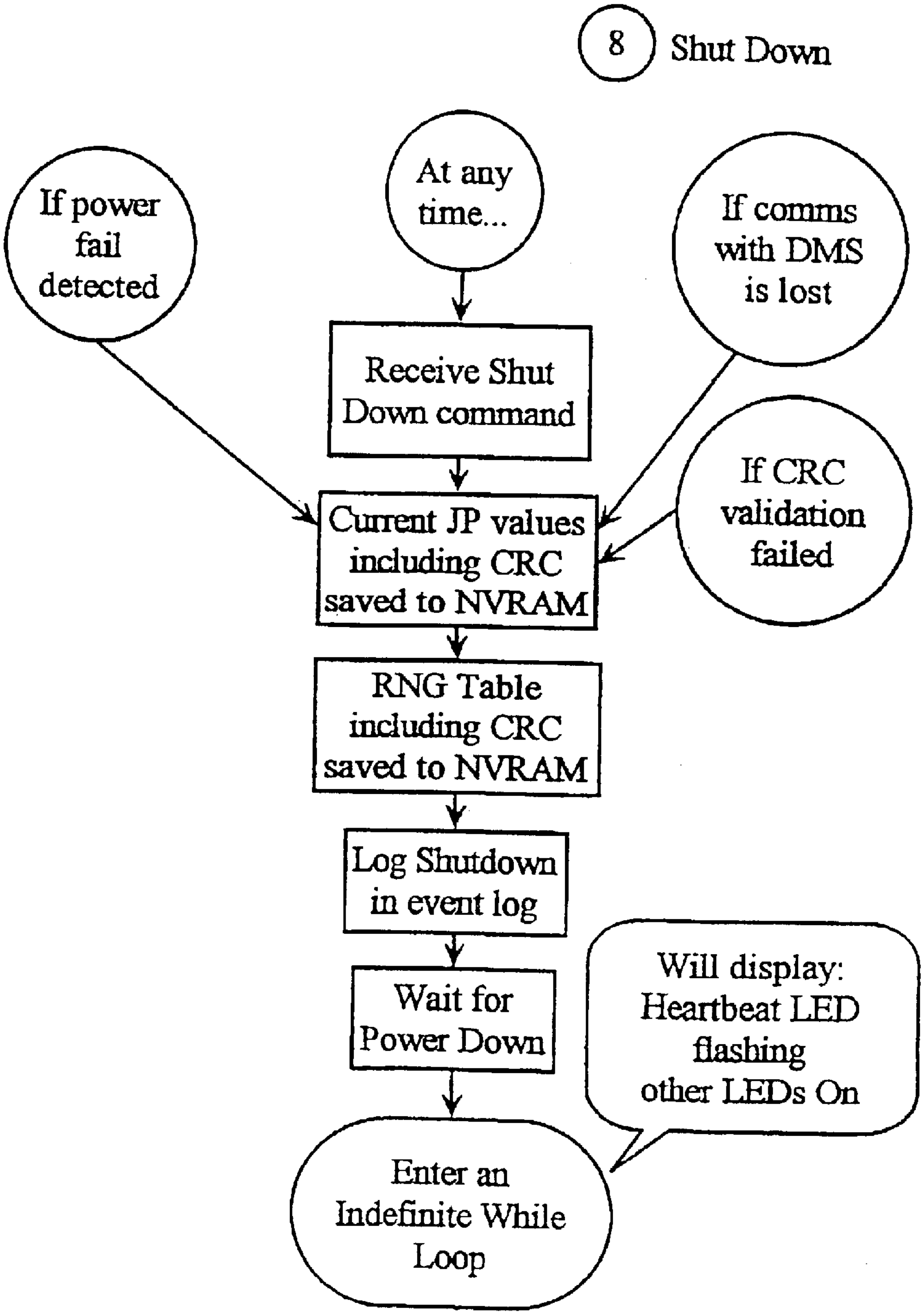
FIG. 30 is a flowchart that illustrates the Shut Down stage referred to in FIG. 22.

FIG. 21 illustrates the major stages in the software flow of the CJC 200.

The Shut Down, Boot Up, 6-Second Poll Cycle, Update Jackpot Levels, Jackpot WIN Generation, Select Winning Venue, Select Winning EGM and Display Winning EGM stages of the CJC 200 software flow referred to in FIG. 21 are expanded upon in FIGS. 22 to 30, respectively.

The foregoing describes only one embodiment of the present invention and modifications, obvious to those skilled in the art, can be made thereto without departing from the scope of the present invention.

It is to be understood that the term "comprising" as used herein is to be understood in the inclusive sense of "having" or "including" and not in the exclusive sense of "consisting essentially of".

What is claimed is:

1. A method of awarding a jackpot value to a gaming machine from among a plurality of gaming machines in a wide area gaming network comprising a central jackpot controller, one or more venue jackpot controllers associated with one or more venues in communication with the central jackpot controller, and each of the gaming machines in communication with one of the one or more venue jackpot controllers, the method comprising the steps of:

- a. randomly determining whether to award the jackpot value by i) generating a random number, ii) comparing the random number to a jackpot hit value, and iii) deciding to award the jackpot value if the random number matches the jackpot hit value, wherein a jackpot hit range for the random number is determined prior to the generating the random number and the jackpot hit range is calculated from SR×(ETC/ATC), where SR is the system range, ETC is the expected turnover contributed and ATC is the actual turnover contributed, and wherein SR and ETC are user provided constants;
- b. randomly selecting a venue for award of the jackpot value by iv) randomly determining a venue hit number in a range from zero to a total increase in turnover contributed from all venue jackpot controllers; and v) adding together an increase in turnover associated with each venue jackpot controller until the addition of the increase in turnover associated with a particular venue jackpot controller results in the venue hit number being equaled or exceeded;
- c. randomly selecting a gaming machine for award of the jackpot value in proportion to turnover contributed from each gaming machine associated with the venue jackpot controller responsible for the venue hit number being equaled or exceeded; and
- d. awarding the jackpot value to the selected gaming machine.

2. The method of claim 1, wherein the jackpot value has an initial value that is randomly determined.

3. The method of claim 1, further comprising periodically increasing the jackpot value by a percentage of a total increase in turnover associated with the venue jackpot controllers.

4. The method of claim 1, wherein the jackpot hit value is a predetermined constant.

5. The method of claim 1, wherein the step of randomly selecting the gaming machine for award of the jackpot value is repeated if the jackpot value is unsuccessfully awarded to a gaming machine.

6. The method of claim 1, wherein there are multiple jackpot values and the steps are repeated for each jackpot value.

7. The method of claim 1, wherein the steps are completed within a fixed polling cycle.

8. The method of claim 1, wherein the steps are completed within a fixed polling cycle in the rage 1 to 10 seconds.

9. The method of claim 1, wherein the steps are completed within a fixed polling cycle of 6 seconds.

10. The method of claim 1, wherein the selected gaming machine is selected by vi) randomly determining a gaming machine hit number within a range of numbers equal to a total turnover of all gaming machines in the wide area gaming network at the winning venue; vii) adding together an increase in turnover of each gaming machine associated with the venue jackpot controller responsible for the venue hit number being equaled or exceeded until the addition of the increase in turnover of a particular gaming machine results in the gaming machine hit number being equaled or exceeded.

11. The method of claim 10, wherein the gaming machine hit number is determined to be in a range from zero to a total increase in turnover contributed from all gaming machines associated with the winning venue.

12. A system for awarding a jackpot value in a wide area network, the system comprising:

- a central jackpot controller;
- one or more venue jackpot controllers associated with one or more venues;
- a wide area communications network linking the central jackpot controller and the one or more venue controllers;
- a local area communications network associated with each of the one or more venue jackpot controllers via the local area communications network; and
- a plurality of electronic gaming machines in communication with each of the one or more venue jackpot controllers via the local area communications network;
- wherein the central jackpot controller includes a preprocessor programmed to:
  - (a) periodically poll the venue jackpot controllers to obtain turnover data,
  - (b) randomly determine whether to award the jackpot value in inverse proportion to turnover contributed within a polling cycle,
  - (c) randomly select the venue for award of the jackpot value based upon the turnover data, and
  - (d) randomly select the electronic gaming machine to be award the jackpot value based upon the turnover data.

13. The system of claim 12, wherein the turnover data includes venue turnover data and electronic gaming machine turnover data.

14. The system of claim 12, wherein the venue jackpot controllers are periodically polled according to a fixed polling cycle.

15. The system of claim 14, herein the fixed polling cycle is in the range of 1 to 10 seconds.

16. The system of claim 14, wherein the fixed polling cycle is 6 seconds.

17. A wide area gambling network, comprising:

- a central jackpot controller including a random number generator;
- one or more venue jackpot controllers associated with one or more venues in communication with the central jackpot controller; and one or more gaming machines gaming machines in communication with each of the one or more venue jackpot controllers;

wherein the central jackpot control: periodically polls the venue jackpot controllers to determine Actual Turnover Contributed by the one or more gaming machines in a poll period, calculates a random number equals a jackpot hit value, randomly determines whether to award the jackpot in inverse proportion to turnover contributed within a polling cycle, selects a venue to be awarded the jackpot value, and selects a gaming machine at the venue to be awarded the jackpot value.

18. The wide area gaming network of claim 17, wherein a poll period is a fixed poll period.

19. The wide area gaming network of claim 17, wherein the poll period is in the range 1 to 10 seconds.

20. The wide area gaming network of claim 17, wherein the poll period is 6 seconds.

21. A method of awarding a jackpot value to a gaming machine from among a plurality of gaming machines in a wide area gaming network comprising a central jackpot controller, one or more venue jackpot controllers associated with one or more venues in communication with the central jackpot controller, and each of one or more gaming machines in communication with one of the one or more venue jackpot controllers, the method comprising the steps of:

a. periodically polling the venue jackpot controller to obtain turnover data;

b. randomly determining whether to award the jackpot value in inverse proportion to turnover contributed within a polling cycle;

c. randomly selecting a winning venue in proportional to turnover contributed from each venue by:

i) randomly determining a venue hit number within a range of numbers equal to a total turnover of all venues in the wide area gaming network;

ii) adding together an increase in turnover associated with each venue jackpot controller until the addition of the increase in turnover associated with a particular venue jackpot controller results in a venue hit number being equaled or exceeded; and ii) selecting the venue associated with the particular venue jackpot controller as the winning venue;

d. randomly selecting a gaming machine at the winning venue for award of the jackpot value in proportion to turnover contributed from each gaming machine at the winning venue by:

iv) randomly determining a gaming machine hit number within a range of numbers equal to a total turnover of all gaming machines in the wide area gaming network at the winning venue;

iv) adding together an increase in turnover of each gaming machine at the winning venue until an addition of the increase in turnover of a particular gaming machine results in the gaming machine hit number being equaled or exceeded; and e. awarding the jackpot value to the particular gaming machine.

22. The method of claim 21, wherein the steps are completed within a fixed polling cycle.

23. The method of claim 21, wherein the steps are completed within a fixed polling cycle in a range 1 to 10 seconds.

24. A method of awarding a jackpot value to a gaming machine from among a plurality of gaming machines each associated with one of a plurality of venues, the method comprising:

randomly determining whether to award the jackpot value in inverse proportion to turnover contributed within a polling cycle;

randomly selecting a venue from among the venues for award of the jackpot value;

randomly selecting a gaming machine at the selected venue for award of the jackpot value; and awarding the jackpot value to the selected gaming machine.

25. The method of claim 24, wherein the selected venue is selected in proportion to turnover contributed the plurality of venues.

26. The method of claim 24, wherein the selected gaming machine is selected in proportion to turnover contributed from each gaming machine associated with the selected venue.

* * * * *